US008843879B2

(12) United States Patent
Howard

(10) Patent No.: US 8,843,879 B2
(45) Date of Patent: Sep. 23, 2014

(54) SOFTWARE DESIGN AND AUTOMATIC CODING FOR PARALLEL COMPUTING

(75) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 393 days.

(21) Appl. No.: 13/231,845

(22) Filed: Sep. 13, 2011

(65) Prior Publication Data

US 2012/0066664 A1 Mar. 15, 2012

Related U.S. Application Data

(60) Provisional application No. 61/382,405, filed on Sep. 13, 2010.

(51) Int. Cl.
*G06F 9/44* (2006.01)

(52) U.S. Cl.
CPC ........................................ *G06F 8/20* (2013.01)
USPC ........................................................ 717/104

(58) Field of Classification Search
CPC ........................................................ G06F 8/41
USPC ........................................................ 717/104
See application file for complete search history.

(56) References Cited

U.S. PATENT DOCUMENTS

| | | | |
|---|---|---|---|
| 5,999,729 A * | 12/1999 | Tabloski et al. | 717/105 |
| 6,857,004 B1 | 2/2005 | Howard et al. | |
| 7,197,739 B2 | 3/2007 | Preston et al. | |
| 7,376,550 B1 * | 5/2008 | Bokaemper et al. | 703/27 |
| 7,418,470 B2 | 8/2008 | Howard et al. | |
| 7,730,121 B2 | 6/2010 | Howard et al. | |
| 7,752,606 B2 | 7/2010 | Savage | |
| 2003/0140332 A1 | 7/2003 | Norton et al. | |
| 2003/0195938 A1 * | 10/2003 | Howard et al. | 709/208 |
| 2005/0038852 A1 | 2/2005 | Howard | |
| 2008/0059950 A1 | 3/2008 | Seitz et al. | |
| 2008/0288632 A1 * | 11/2008 | Cantor et al. | 709/224 |
| 2009/0077483 A9 | 3/2009 | Howard et al. | |
| 2010/0049941 A1 | 2/2010 | Howard | |
| 2010/0094924 A1 | 4/2010 | Howard et al. | |
| 2010/0183028 A1 | 7/2010 | Howard et al. | |
| 2010/0185719 A1 | 7/2010 | Howard | |
| 2011/0314458 A1 * | 12/2011 | Zhu et al. | 717/149 |

OTHER PUBLICATIONS

International Search Report and Written Opinion issued in related PCT Patent Application Serial No. PCT/US2011/0514, dated Apr. 10, 2012, 11 pages.

* cited by examiner

*Primary Examiner* — Li B Zhen
*Assistant Examiner* — Lenin Paulino
(74) *Attorney, Agent, or Firm* — Lathrop & Gage LLP

(57) ABSTRACT

We discuss a software design and automatic coding system particularly applicable to generating code for massively parallel computing systems. This system operates on a high performance computer and provides a collaborative, interactive, iterative method of defining and designing software for parallel computing systems, and generates software code directly from design elements without the use of code patterns, meta-data, or domain rules, reducing bugs and cost while retaining the time-to-market advantages of iterative ad-hoc methods.

9 Claims, 23 Drawing Sheets

FIG. 2

| View Post | Post | Un-Post | User Data | Client Requests | Buglist | Software Design | Keyword List | | Return | Logout |
|---|---|---|---|---|---|---|---|---|---|---|
| ▼ | Org 1 | Org 2 | Org 3 | ▲ | ▼ | Cat 1 | Cat 2 | Cat 3 | Cat 4 | ▲ |
| ▼ | Kernel 1 | Kernel 2 | Kernel 3 | Kernel 4 | DB 1 | Kernel 5 | Kernel 6 | Kernel 7 | Algor 1 | ▲ |
| Add Kernel | Change Kernel | Delete Kernel | Test Kernel | Add Alg | Change Alg | Delete Alg | Test Alg | Add Cat | Change Cat | Delete Cat |
| Add DB | Change DB | Delete DB | Req. Doc | HL Design | Detail Design | Test Plans | Req. Trace | Auto. Coding | Privileges | |

200 — table; 202 — Software Design; 204 — Req. Doc; 206 — HL Design; 208 — Detail Design; 210 — Test Plans; 212 — Req. Trace; 214 — Auto. Coding; 216 — Privileges

FIG. 4

| View Post | Post | Un-Post | User Data | Client Requests | Buglist | Software Design | Keyword List | | | Return | Logout |
|---|---|---|---|---|---|---|---|---|---|---|---|
| ▼ | Org 1 | Org 2 | Org 3 | ▲ | ▼ | | Cat 1 | Cat 2 | Cat 3 | Cat 4 | |
| ▼ | Kernel 1 | Kernel 2 | Kernel 3 | Kernel 4 | DB 1 | Kernel 5 | Kernel 6 | Kernel 7 | | Algor 1 | ▲ |
| Add Kernel | Change Kernel | Delete Kernel | Test Kernel | Add Alg | Change Alg | Delete Alg | Test Alg | Add Cat | | Change Cat | ▲ |
| Add DB | Change DB | Delete DB | Req. Doc | HL Design | Detail Design | Test Plans | Req. Trace | Auto Coding | | | Delete Cat |
| Ch 1 Purpose | Ch 2 Market | Ch 3 Product | Ch 4 Req | Ch 5 Constr | Ch 6 Workflow | Ch Eval | View Chpt. | Write Chpt | | Privileges 216 | |

Not Visible While Granting Privileges

Show All ⌢ 268

Document Title

Show All ⌢ 276

List of Organization's Members

Return    Select

| View Post | Post | Un-Post | User Data | Client Requests | Buglist | Software Design | Keyword List | | Return | Logout |
|---|---|---|---|---|---|---|---|---|---|---|
| ▽ | Org 1 | Org 2 | Org 3 | ▲ | ▽ | *Software Design* — 202 | Cat 1 | Cat 2 | Cat 3 | Cat 4 | | ▲ | ▲ |
| ▽ | Kernel 1 | Kernel 2 | Kernel 3 | Kernel 4 | DB 1 | Cat 1 | Kernel 5 | Kernel 6 | Kernel 7 | Algor 1 | | | |
| Add Kernel | Change Kernel | Delete Kernel | Test Kernel | Add Alg | Change Alg | Delete Alg | Test Alg | Add Cat | Change Cat | | | | |
| Add DB | Change DB | Delete DB | Req. Doc | HL Design | Detail Design | Test Plans | Req Trace | Auto Coding | *Privileges* 216 | | | | |
| Ch 1 Purpose | Ch 2 Market | Ch 3 Product 254 | Ch 4 Req | Ch 5 Constr | Ch 6 Workflow 260 | Ch Eval | View Chpt | Write Chpt | | | Delete Cat | | |

Show All ~ 268

Show All ~ 276

Not Visible While Granting Privileges

Document Title

Member 1

Member 2 — 278

Member 3

Return    Select

FIG. 5

| View Post | Post | Un-Post | User Data | Client Requests | Buglist | Software Design | Keyword List | | Return | Logout |
|---|---|---|---|---|---|---|---|---|---|---|
| | | | | | | | | | | Logout |
| ▼ | Org 1 | Org 2 | Org 3 | ▲ | ▼ | Software Design | Cat 2 | Cat 3 | Cat 4 | ▲ |
| ▼ | Kernel 1 | Kernel 2 | Kernel 3 | Kernel 4 | DB 1 | Cat 1 | Kernel 6 | Kernel 7 | Algor 1 | ▲ |
| Add Kernel | Change Kernel | Delete Kernel | Test Kernel | Add Alg | Change Alg | Kernel 5 | Test Alg | Add Cat | Change Cat | Delete Cat |
| Add DB | Change DB | Delete DB | Req. Doc | HL Design | Detail Design | Delete Alg | Req. Trace | Auto Coding | Privileges | |
| Ch 1 Purpose | Ch 2 Market | Ch 3 Product | Ch 4 Req | Ch 5 Constr | Ch 6 Workflow | Test Plans | View Chpt. | Write Chpt. | | |
| | | | | | | Ch Eval. | | | | |

[ Return ] [ Select ]

[ Show All ]

[ Example Title 1 ]

[ Member 2 ]

FIG. 6

| View Post | Post | Un-Post | User Data | Client Requests | Buglist | Software Design | Keyword List | Return | Logout |
|---|---|---|---|---|---|---|---|---|---|
| ▽ | Org 1 | Org 2 | Org 3 | ▲ | ▽ | Cat 1 | Cat 2 | Cat 3 | Cat 4 | ▲ |
| ▽ | Kernel 1 | Kernel 2 | Kernel 3 | Kernel 4 | DB 1 | Kernel 5 | Kernel 6 | Kernel 7 | Algor 1 | ▲ |
| Add Kernel | Change Kernel | Delete Kernel | Test Kernel | | | | | | |
| Add DB | Change DB | Delete DB | Req. Doc | | | | | | Delete Cat |
| Ch 1 Purpose | Ch 2 Market | Ch 3 Product | Ch 4 Req | | | | | | |

Chapter 3 Product Overview and Use Case (Write/Edit)

Example Title 1

Member 2

Return    Select

Submit
304

Page 8 of 20

| View Post | Post | Un-Post | User Data | Client Requests | Buglist | Software Design | | Keyword List | | | Return | Logout |
|---|---|---|---|---|---|---|---|---|---|---|---|---|
| ▽ | Org 1 | Org 2 | Org 3 | ▲ | ▽ | Cat 1 | Cat 2 | Cat 3 | | Cat 4 | ▲ |
| ▽ | Kernel 1 | Kernel 2 | Kernel 3 | Kernel 4 | DB 1 | Kernel 5 | Kernel 6 | Kernel 7 | | Algor 1 | ▲ |
| Add Kernel | Change Kernel | Delete Kernel | Test Kernel | Add Alg | Change Alg | Delete Alg | Test Alg | Add Cat | | Change Cat | Delete Cat |
| Add DB | Change DB | Delete DB | Req. Doc | HL Design | Detail Design | Test Plans | Req Trace | Auto Coding | | Privileges | |
| | | | | | | Document Title | | | Show All | | | |

Return

FIG. 8

Requirements Traceability Matrix

| Trace Element # | Requirement Title | Page # & Link | HL Design Tupple & link | Detail Design Tupple & link | Code Element Name & link | Test # & Link |
|---|---|---|---|---|---|---|
| Element # | Requirement Title | PRD page link | 356 | | | |
| Element # | Requirement Title | PRD page link | | | | |
| Element # | Requirement Title | PRD page link | | | | |
| Element # | Requirement Title | PRD page link | | | | |

350

354

SUBMIT 352

FIG. 9

| View Post | Post | Un-Post | User Data | Client Requests | Buglist | Software Design | Keyword List | | | Return | Logout |
|---|---|---|---|---|---|---|---|---|---|---|---|
| ▽ | Org 1 | Org 2 | Org 3 | ▲ | ▽ | Cat 1 | Cat 2 | Cat 3 | Cat 4 | △ |
| ▽ | Kernel 1 | Kernel 2 | Kernel 3 | Kernel 4 | DB 1 | Kernel 5 | Kernel 6 | Kernel 7 | Algor 1 | △ |
| Add Kernel | Change Kernel | Delete Kernel | Test Kernel | Add Alg | Change Alg | Delete Alg | Test Alg | Add Cat | Change Cat | Delete Cat |
| Add DB | Change DB | Delete DB | Req. Doc | HL Design | Detail Design | Test Plans | Req Trace | Auto Coding | Privileges — 216 |
| Decomp Analysis 372 | Control Anal 374 | Data Diction. 376 | Signal Diction. 378 | | | | View Design 380 | Write Design 382 |

— 202 (Software Design)
— 206 (HL Design)
— 208 (Detail Design)

Document Title
Show All
~ 268

Return

FIG. 11

| Flow Type (data/control) | Flow Name | Unit Name | Unit Type |
|---|---|---|---|
|  |  |  |  |
|  |  |  |  |
|  |  |  |  |
|  |  |  |  |

Test Procedure: Example System (0)

Enter Test Name (Associated bubble Select
name)
Proced
ure

Inputs:

| Data Input Name | Data Input Type | Data Input Value |
|---|---|---|
| Data Input Name | Dat a Input Type | Data Input Value |

Expected Outputs:

| Data Output Name | Data Output Type | Data Output Value |
|---|---|---|
| Data Output Name | Data Output Type | Data Output Value |

Submit

Previous       Next

FIG. 23

SOFTWARE DESIGN AND AUTOMATIC CODING FOR PARALLEL COMPUTING

RELATED APPLICATIONS

This application claims priority to U.S. Provisional Patent Application Ser. No. 61/382,405, filed Sep. 13, 2010, the disclosure of which is incorporated herein by reference.

FIELD

The present application relates to the field of manual and automatic systems and methods for preparing software for execution on parallel computing platforms.

BACKGROUND

As the cost and availability of processors decreases, there has been increasing interest in coupling many processors together to provide the huge amounts of computing power required to solve previously intractable problems. Among applications that are thought to be amenable to solution with such massively parallel machines are problems involving weather prediction, climate and ocean current modeling, nuclear fusion reactor modeling, dynamic modeling of galactic collisions, assembling decoded fragments of DNA into chromosome-level DNA databases, and similar tasks involving large numbers of variables and large datasets.

Several architectures have been previously disclosed for parallel processing, including the Howard Cascade. Hardware alone, however, does not solve applications; software must be prepared to direct the hardware into finding a solution.

While software development for single processor machines, and for machines providing limited parallelism, has reached a high state of art; methods have not previously been perfected for subdividing massive problems into subtasks, submitting and executing those subtasks on many processors in a massively parallel processor, and collecting and refining results into useful solutions.

For expediency, modern computer software is usually created in a quasi-ad-hoc fashion. That is, design is simply a sketch that the programmer uses as a guide in some iterative development effort in order to reduce development time, allowing for enhanced time-to-market. Unfortunately, on average, 70 software bugs per 1,000 lines of software generated occur. Thus, for a one million source-line software system with, on average, 7000 bugs, detecting and repairing the bugs both during testing and after product release costs $2,461,200.

Traditionally, the documentation that comprises a design quickly gets out of sync with the software. Maintaining both the software and the design documentation is twice the effort, without twice the net benefit to the organization, because there is usually no direct causal relationship between the code and the documentation. A model that allows most of the code to be generated automatically from the design documentation, without coding constructs being placed in that documentation, and that creates a change in the code whenever a change is made to the documentation makes the double effort unnecessary.

Automatic Code Generation Methods

There are currently three standard models of automatic software generators: design patterns, domain meta-data usage, and domain rules.

Design Pattern

A design pattern occurs when a coding template is used with some user-defined data to create the software. For instance, adherence to a particular Application Programming Interface (API) standard as a template allows code to be generated to that standard.

Domain Meta-Data

In the domain of database designs, databases can be created from entity-relationship diagrams which comprise the meta-data defining the interactions that can be used in a particular database.

Domain Rules

Domain rules are any set of rules used within a particular knowledge area. In the domain of bioinformatics, the rules describing the translation of DNA to proteins comprise that field's domain rules. When the rules are precise enough, they can be used to generate software in that domain.

What is missing from existing automatic code generators is a generally applicable automatic code-generation solution.

The term Howard Cascade as used herein refers to a category of massively parallel computing systems as disclosed in U.S. Pat. Nos. 6,857,004, 7,418,470, and 7,730,121, US Patent Publications 20050038852, 20100185719, 20100049941, 20100094924, 20100183028 and 20090077483, the disclosures of which are incorporated herein by reference. Howard Cascades typically have one or more access or home nodes or machines, one or more processing nodes or machines, and a communications system interconnecting the access nodes and processing nodes. During program execution, processing nodes are typically dynamically organized into a hierarchical cascade.

SUMMARY

We discuss a software design and automatic coding system particularly applicable to generating code for massively parallel computing systems. This system operates on a high performance computer and provides a collaborative, interactive, iterative method of defining and designing software for parallel computing systems, and generates software code directly from design elements without the use of code patterns, meta-data, or domain rules, reducing bugs and cost while retaining the time-to-market advantages of iterative ad-hoc methods.

BRIEF DESCRIPTION OF THE FIGURES

FIG. 2 is an illustration of a main screen display of a workstation of the system, showing selection of software design buttons.

FIG. 4 is an illustration of a main screen display of a workstation of the system, showing selection of privileges assignment buttons.

FIG. 5 is an illustration of a main screen display of a workstation of the system, showing assignment of write privileges to a user for portions of a software design.

FIG. 6 is an illustration of a main screen display of a workstation of the system, showing write privileges.

FIG. 7 is an illustration of a screen display of a workstation of the system, illustrating a popup edit window.

FIG. 8 is an illustration of a main screen display of a workstation of the system, showing selection of software design buttons.

FIG. 9 is an illustration of a requirements traceability matrix.

FIG. 11 is an illustration of a screen display of a workstation of the system, illustrating opening a FIG. 12 is an illustration of a screen display popup for entry of decomposition analysis.

FIG. 23 is an illustration of a Test Procedures Popup window.

DETAILED DESCRIPTION OF THE EMBODIMENTS

Figure 1:
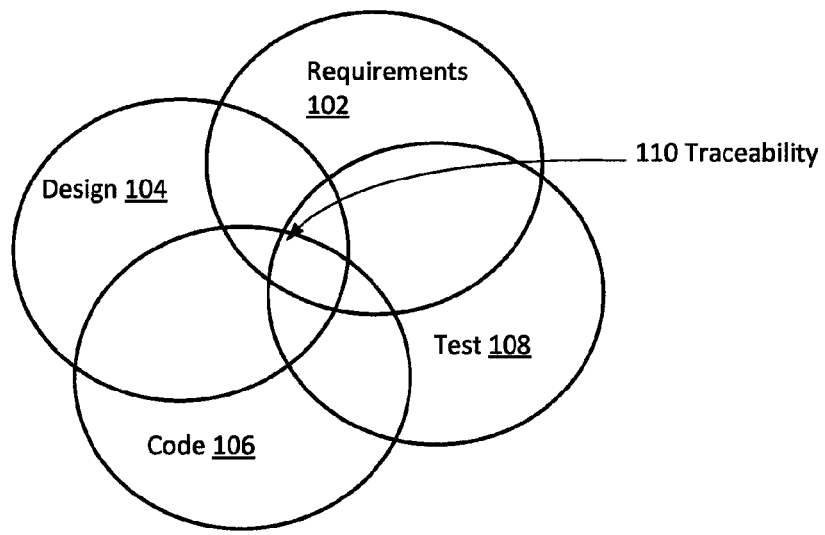
FIG. 1 is a Venn diagram illustrating the most important features of software development.

In this document, Massively Parallel Technologies is abbreviated MPT. A few definitions as used herein:

1) MPT Control Kernel—An MPT Control Kernel is some software routine or function that shall contain only the following types of computer language constructs: subroutine calls, looping statements (for, while, do, etc), decision statements (if-then-else, etc), and branching statements (goto, jump, continue, exit, etc.).
2) MPT Process Kernel—An MPT Process Kernel is some software routine or function that shall not contain the following types of computer language constructs: subroutine calls, looping statements, decision statements, or branching statements. Information is passed to and from an MPT Process Kernel via shared memory, using the MPT Data Transfer model.
3) Mixed Kernels—A Mixed Kernel is some software routine or function that shall include both MPT control kernel and MPT process kernel computer language constructs.
4) MPT Data Transfer Model—The MPT Data Transfer Model consists of a standard model for transferring information to/from an MPT Process Kernel. The parameters for this procedure are: integer key, long_int starting address, long_int size, int structure_index. The key is the current job number, the starting address is the information starting address, the size is the number of bytes the data construct uses, and the structure_index points to the structure definition that is used by the MPT Process Kernel to interpret the memory locations accessed.
5) MPT Control Transfer Model—The MPT Control Transfer Model consists of a standard model for transferring control information to the MPT State Machine. Accessing a control variable means using the Key, starting address and structure index values.
6) MPT State Machine—A MPT State Machine is a two-dimensional matrix which links together all of the MPT Control Kernels into a single non-language construct that call MPT Process Kernels. Each row in a MPT State Machine consists of an index, the subroutine to be called (or the symbol NOP indicating No-Operation), a conditional statement, a index to the next accessible row (when the condition is true) or the end-of-job symbol), and an index to the next accessible row (when the condition is false, or the end-of-job symbol).

Prior to software generation, several questions arise regarding design: What is the purpose? What are the steps of good design? When is it finished?

Design Purpose:

to understand a problem and what the solution needs to include so that all necessary functionality is incorporated into the solution and all individual tasks required to implement the solution are trivial tasks.

If all of the tasks required to reach some solution are trivial, then the probability of generating errors while performing those tasks decreases immensely.

Software Design Completion:

when 100% separation between software processing and software control is reached.

Software consists of two primary elements: processing and control. Processing is the transformation, display, movement or storage of data. Control dictates decisions concerning which processing is to occur. By fully separating processing and control, the complexity of each is minimized. Further, software control becomes a series of formal, separable, simple state machines. This simplification can greatly decrease the incidence of software errors.

Fully separating processing from control means that there are software modules that contain transformation/display/data-storage or subroutine calls, looping-structures (calling subroutines), and branching statements (calling subroutines). Thus, data movement is encapsulated into fixed structures rather than being hidden by control statements. Since parallelization requires knowledge of either the data movement pattern or variable-level cross-coupling at the code-statement level, determining the parallel processing techniques required becomes very easy when control and processing are separated.

Within the design methodology, there is enough information found in the control element definitions to completely automate the coding of all control elements. Although the process elements cannot be automatically coded, their purpose and relationship to the rest of the system can be coded; that is, detailed stub code can be written automatically.

Design Steps:

There are four functional elements needed to construct a practical computer software system, as illustrated in FIG. 1: requirements 102, design 104, code 106, and test 108. In an agile design methodology, these four elements overlap and interact in an iterative fashion. That is:

1. The act of designing 104 a system can affect the requirements 102, the code 106, and the tests 108.

2. The act of requiring 102 affects the design 104, the code 106, and the tests 108.
3. The act of coding 106 can affect the design 104, the requirements 102, and the tests 108.
4. The act of testing 108 can affect the design 104, the requirements 102, and the code 106.

Where these elements come together is called the requirement traceability matrix 110. The requirement traceability matrix is a table (discussed below with reference to FIG. 9) that contains the traceability element number, the text of the requirements 102, the design element tuples as part of design 104, the code element names of portions of code 106, and the test numbers of associated tests of tests 108; in an embodiment the traceability matrix 110 also incorporates links to associated portions of code 106, requirements 102, design 104 and tests 108 to allow rapid reference to those elements.

The system is complete when all requirements can be traced to design, code, and test elements and when there are no design, code or test elements not included in the trace. Thus, the requirements traceability matrix 110 serves to monitor system construction progress. This also insures that only required elements are performed by the system.

Design System

Figure 1A:
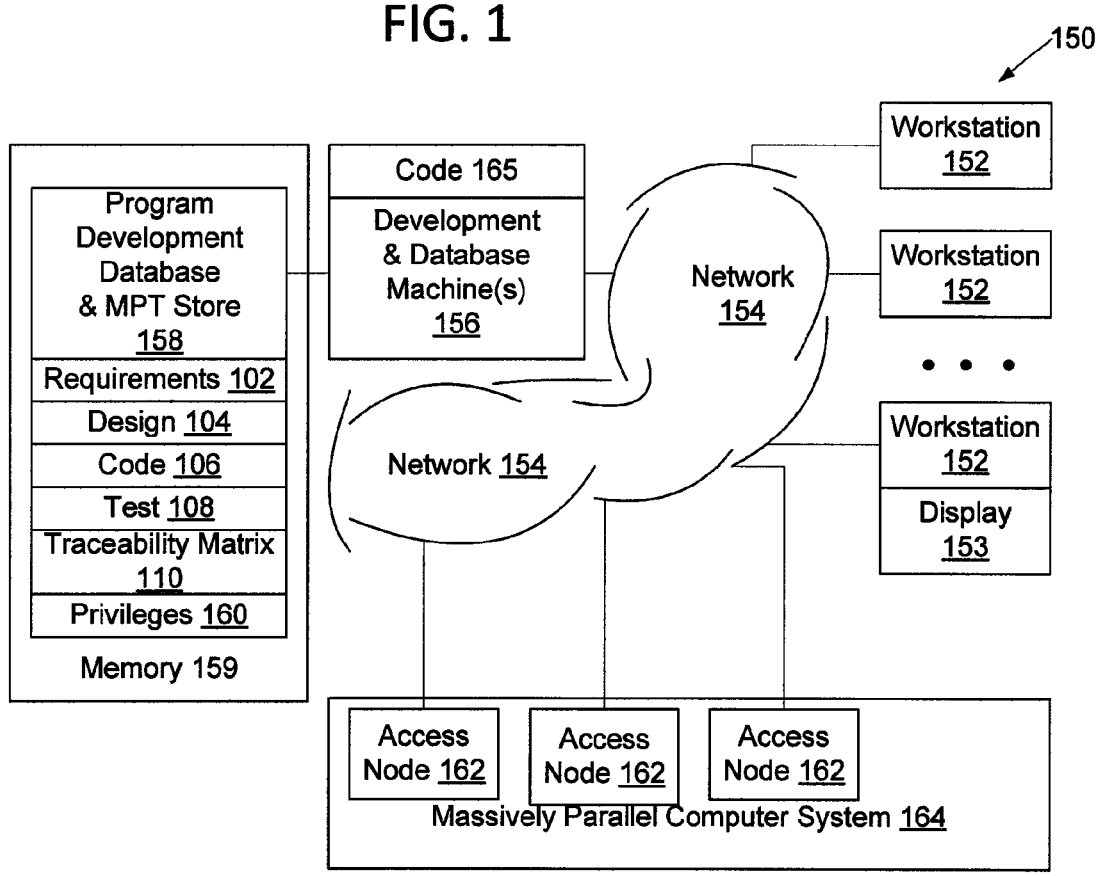
FIG. 1A is a block diagram illustrating hardware components of the system.

In order to provide support for designing, preparing, and testing application and system software for our parallel computer systems, an MPT interface and development system 150 as illustrated in FIG. 1A is provided. This system 150 provides a number of workstations 152, each of which may be provided to a human developer and/or development manager. These workstations are coupled together over a network 154 and to one or more development machines 156, hereinafter often referred to collectively with workstations 152 as the MPT Cluster System. One or more of development machines 156 may also double as a workstation 152. Each of workstations 152 has one or more displays 153 and suitable human-interface devices such as a keyboard and a mouse, trackball, touchscreen, or other input device. Development machines 156 maintain a central design database 158 in a large, redundant, disk memory system 159 that includes requirements 102, design elements 104, code elements 106, and test routines 108, along with privileges 160 and other information relevant to the software.

In order to provide for testing of the software, the development system 150 is also connected through network 154 to access nodes 162 of at least one massively parallel computing system 164, such as a Howard Cascade incorporating many individual processors each associated with memory and system interconnect. In at least one embodiment, the development system 150 couples to a home node of a Howard Cascade massively-parallel computing system.

The development machine 156 contains computer readable code 165 in a memory for generation of the following screens on workstations 152, for updating and operating with design database 158, and for automatically generating machine-readable and executable code for parallel computing system 164 from information extracted from design database 158.

In an embodiment network 154 is a local area network, in an alternative embodiment network 154 contains part or all of one or more local area networks and portions of the Internet.

Main Developer Screen

On the Main screen 200, as displayed on a display 153 of a workstation 152 when the MPT Interface system is started and invoked for a particular software project, is the Software Design button 202. When the Software Design button is selected, the five design element buttons are displayed: Requirements 204, High Level Design 206, Detailed Design 208, Test Plans & Procedures 210, and Requirements Traceability 212, as shown in FIG. 2. When detailed design 208 is present, also displayed is an Auto Coding button 214. Available to development managers and/or administrators is a Privileges button 216.

Product Requirements Document (PRD)

Writing requirements is a critical part of any application development effort. It not only lays out the product but forms the basis of traceability. Without requirements, a distributed team of developers would have a difficult time knowing what to create and when the creation was complete.

A PRD is a document written by an organization that defines the needed features of a product, including a software product. The PRD is stored as part of Requirements 102 in design database 158 on development machines 156, and is editable through workstations 152. This document is written at a high level and contains the following:

Title & author information

Purpose and scope, from both technical and business perspectives

Stakeholder identification

Market assessment and target demographics

Product overview and use cases

Requirements, including function requirements (what a product should do)

usability requirements technical requirements (security, network, platform, integration, client)

environmental requirements support requirements interaction requirements (how the software should work with other systems)

Constraints

Workflow plans, timelines and milestones

Evaluation plan and performance metrics

Thus, a PRD contains not only the requirements but any ancillary information concerning the product as well. The system must be able to separate the requirements from the ancillary data.

The system uses the word "shall" as a keyword indicating that the sentence containing that word is, in fact, a requirement and can be located as such by the automated system. Every requirement, along with its page number, is taken from the requirements document and stored in the requirements portion of the traceability matrix 110 in the development database 158 on development machine 156. The MPT software design system provides a PRD template, as shown below, for use by the developers.

TABLE 1

| Chapter # | Chapter Heading |
|---|---|
| — | Title & Author Page |
| 1 | Purpose & Scope |
| 2 | Market Assessment |
| 3 | Product Overview & Use Case |
| 4 | Requirements |
| 5 | Constraints |
| 6 | Workflow plans, timelines, and milestones |
| 7 | Evaluation Plan & Performance Metrics |

```
Requirement_Document_Data_Request { char message = 105,
                                    char mac_address [12],
                                    char organization_name[32],
                                    char user_name[32],
                                    char password[20],
                                    char document_name [32],
                                    char document_write_privilege [32],
                            }
    Requirement_Document_Data_Return{   char message = 106,
                                        char mac_address [12],
                                        char organization_name[32],
                                        char user_name[32],
                                        char password[20],
                                        char document_name [32],
                                        char document_write_privilege [32],
                            }
```

Figure 3:
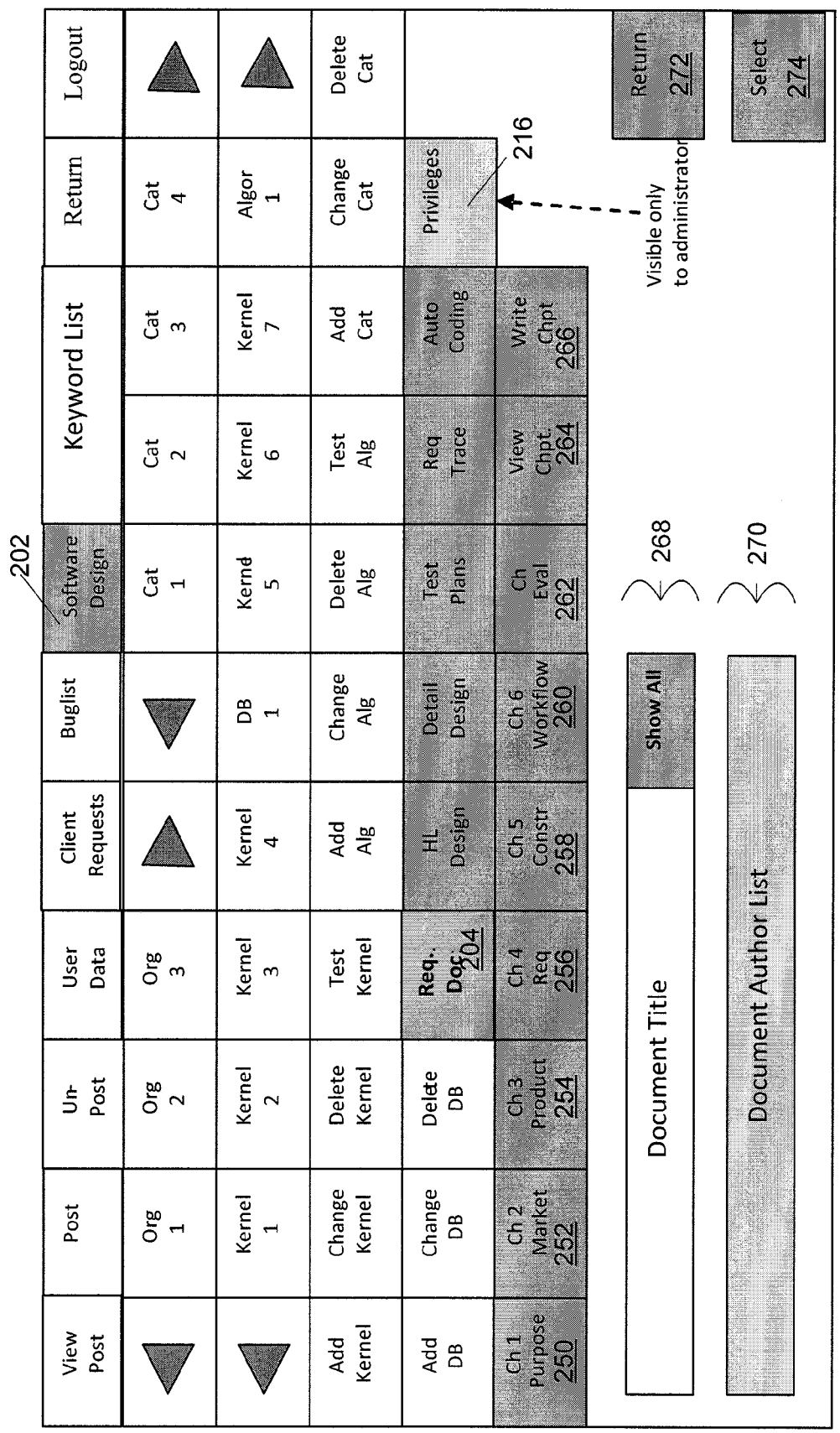
FIG. 3 is an illustration of a main screen display of a workstation of the system, showing selection of requirements document buttons.

Each chapter of the PRD can be accessed independently. The Title and Author Page allows the document chapters to be combined into a single document. Selecting the Requirements Document button 204 from the Main screen shall cause the seven requirements-document chapter-selection buttons 250, 252, 254, 256, 258, and 260, a chapter evaluate button 262, the View Chapter 264 and Write Chapter 266 buttons, as well as the document title 268 and document author list 270 fields, to be displayed, as illustrated in FIG. 3. Also displayed are hierarchical return 272 and selection 274 buttons.

Each chapter can be read independently by anyone within the organization. However, only a development manager or administrative-level user can allow a non-administrative user "write" privileges. Giving document privileges is accomplished by the administrator filling in the document title (new document) or selecting the Show All button followed by double-left clicking on the required document name then selecting the Privileges button. If the Privileges button is not selected then a list of the documents authors is shown. The authors are all of the organization members given write privileges to the document.

If the Privileges button for a PRD chapter is selected (with the appropriate document title) then the list of all organization users is shown, as illustrated in FIG. 4, to permit the development manager or administrative-level user to display all users 276 and to select users to which to grant "write" privileges.

Once the list of an organization's members is displayed, selecting a member 278 (double-left clicking on the member's name) allows the administrator to specify the chapter or chapters for which the member has write privileges. Specifying the chapter simply requires the administrator to select (double-left clicking) one or more of the displayed chapters; in the illustration of FIG. 5 product 254 and workflow 260 chapters are selected.

If an already selected chapter is re-selected, the selected member's write privileges are revoked for that chapter. When a member has no privileges, that member's name is no longer highlighted. Selecting a Req. Doc button followed by the Privileges button, followed by the document name, the member name, and the Select button shall cause the MPT Interface system to generate and send the Requirement write privilege request message to the MPT Cluster System.

```
Requirement_write_privilege_Request {   char message = 83,
                                        char mac_address [12],
                                        char organization_name[32],
                                        char user_name[32],
                                        char password[20],
                                        char member[32],
                                        bool chptr_write_privileges [7],
                                        char document_name [32],
                                        char member_name[32]
                                }
```

Upon receipt of the requirement_write_privilege_request message, the MPT Cluster System shall first determine if the requester is an administrative level user. If the requester is an administrative level user then the MPT Cluster System shall attempt to modify the requirement documents' write privileges to include the selected member. One minus the chapter number shall be used as the array index into chapter write privileges array. A one placed in an array element shall grant write privileges to the chapter that corresponds to that element and a zero shall remove write privileges from the corresponding chapter. If the MPT Cluster System has successfully changed write privileges for the current document then it shall send the return status message to with a zero status to the MPT Interface system.

```
Return_status_message { char message = 2,
                        int return_status = 0
                }
```

If the MPT Cluster System was unsuccessful in changing the write privileges for the current document then the return status message with a one status is sent to the MPT Interface system.

```
Return_status_message { char message = 2,
                        int return_status = 50
                }
```

When granting privileges is complete, the administrator selects the Return button which returns to before the Privileges button was selected, allowing the chapters to be written.

To write a chapter, a member with write privileges enters the document title, selects the Write CHPT button, then selects the correct chapter as illustrated in FIG. 6. Once the Write CHPT button is selected the MPT Interface System generates and sends the Write_Chpt_Request message to the MPT Cluster System:

```
Write_Chpt_Request {    char message = 84,
                        char mac_address [12],
                        char organization_name[32],
                        char user_name[32],
                        char password[20],
                        char document_name [32]
}
```

Upon receipt of the Write_Chpt_Request message, the MPT Cluster System attempts to access the requirements document chapter data. If the requirements document chapter data is correctly accessed then the MPT Cluster System first sends the Return_status message containing a zero status value, followed by the Req_Chptr_Return_Data message to the MPT Interface system:

```
Write_Chpt_Return {     char message = 85,
                        char mac_address [12],
                        char organization_name[32],
                        char user_name[32],
                        char password[20],
                        char document_name [32],
                        int number_bytes_chpt_1,
                        char chpt_1[number_bytes_chpt_1],
                        int number_bytes_chpt_2,
                        char chpt_1[number_bytes_chpt_2],
                        int number_bytes_chpt_3,
                        char chpt_1[number_bytes_chpt_3],
                        int number_bytes_chpt_4,
                        char chpt_1[number_bytes_chpt_4],
                        int number_bytes_chpt_5,
                        char chpt_1[number_bytes_chpt_5],
                        int number_bytes_chpt_6,
                        char chpt_1[number_bytes_chpt_6],
                        int number_bytes_chpt_7,
                        char chpt_1[number_bytes_chpt_7],
}
```

Only those chapters for which the member has write privileges are transmitted back to the requester. If an error occurs when attempting to access the requirement chapter data then the return_status message containing the value 51 shall be returned to the MPT Interface System. Upon receipt of the Write_Chpt_Return message the MPT Interface system shall allow the selection of chapter that is to be modified.

Selecting a chapter for which the member has write privileges causes that chapter's contents to be shown in a pop-up menu 302, as shown in FIG. 7.

Once the chapters have been modified and the member selects the Submit button 304 then the MPT Interface system shall generate and transmit the Modify_Chapt_Request message to the MPT Cluster system.

```
Modify_Chpt_Request {   char message = 86,
                        char mac_address [12],
                        char organization_name[32],
                        char user_name[32],
                        char password[20],
                        char document_name [32],
                        int number_bytes_chpt_1,
                        char chpt_1[number_bytes_chpt_1],
                        int number_bytes_chpt_2,
                        char chpt_1[number_bytes_chpt_2],
                        int number_bytes_chpt_3,
                        char chpt_1[number_bytes_chpt_3],
                        int number_bytes_chpt_4,
                        char chpt_1[number_bytes_chpt_4],
                        int number_bytes_chpt_5,
                        char chpt_1[number_bytes_chpt_5],
                        int number_bytes_chpt_6,
                        char chpt_1[number_bytes_chpt_6],
                        int number_bytes_chpt_7,
                        char chpt_1[number_bytes_chpt_7],
}
```

Upon receipt of the Modify_Chpt_Request message the MPT Cluster system shall attempt to store the modified requirement document chapters into a database. Successful entry of the modify_chapt_request message data shall cause the MPT Cluster system to transmit the Return_status message containing a zero in the status field. If the MPT Cluster system is unable to store the modified chapter data in the database then the MPT Cluster system shall transmit the Return_status message containing a 52 in the status field.

In order to view a chapter, a member selects the View CHPT button instead of the Write CHPT button, followed by the chapter to be viewed. The selection of the View CHPT button shall cause the MPT Interface system to create and send the View_Chpt_request message to the MPT Cluster system.

```
View_Chpt_Request {     char message = 84,
                        char mac_address [12],
                        char organization_name[32],
                        char user_name[32],
                        char password[20],
                        char document_name [32]
}
```

Upon receipt of the View_Chpt_Request message, the MPT Cluster system 156 shall access the requirements chapters portion of requirements database 102. If the MPT Cluster is able to access the chapter data then it shall generate and transmit the return_status message with a zero in the status field, followed by the View_Chpt_Return message.

```
View_Chpt_Return {      char message = 87,
                        char mac_address [12],
                        char organization_name[32],
                        char user_name[32],
                        char password[20],
                        char document_name [32],
                        int number_bytes_chpt_1,
                        char chpt_1[number_bytes_chpt_1],
                        int number_bytes_chpt_2,
                        char chpt_1[number_bytes_chpt_2],
                        int number_bytes_chpt_3,
                        char chpt_1[number_bytes_chpt_3],
                        int number_bytes_chpt_4,
                        char chpt_1[number_bytes_chpt_4],
                        int number_bytes_chpt_5,
                        char chpt_1[number_bytes_chpt_5],
                        int number_bytes_chpt_6,
                        char chpt_1[number_bytes_chpt_6],
                        int number_bytes_chpt_7,
                        char chpt_1[number_bytes_chpt_7],
}
```

If the chapter data is not accessible, then the MPT Cluster system shall generate and send the return_status message with a 53 value in the status field.

The selection of the Submit button shall cause the MPT Interface to return to before the View Chapter (View Chpt) button was selected.

Below are the messages that can be displayed on the requirement document screen,
1. Privileges Successfully Submitted
2. Privileges Submission Unsuccessful
3. Chapter Changed Successfully
4. Chapter Not changed Error
5. Different Machine Used Requirement Traceability Matrix The requirements traceability matrix (RTM) 110 links all product design, code, and test elements to what is required for the product. The RTM gathers the requirements from Chapter 4 of the Product Requirement Document. Every sentence in Chapter 4 that contains "shall", along with the page number, is entered into the matrix. An administrator-level member selecting the Req. Trace button then filling in the Document Title field shall cause the MPT Interface system to generate and send the Req_Trace_Request message to the MPT Cluster system

```
Req_Trace_Request {    char message = 88,
                       char mac_address [12],
                       char organization_name[32],
                       char user_name[32],
                       char password[20],
```

-continued

```
                       char document_name [32],
}
```

Upon receipt of the Req_Trace_request message, the MPT Cluster system shall attempt to obtain the traceability matrix associated with the current document name. If the MPT Cluster system is successful in accessing the data then it shall first generate and send the return_status message with a zero in the status field, followed by the Req_Trace_Return message.

```
Req_Trace_Return {     char message = 89,
                       char mac_address [12],
                       char organization_name[32],
                       char user_name[32],
                       char password[20],
                       char document_name [32],
                       char document_write_privilege [32],
                       int number_require_traceability_bytes,
                       char
}                      RT_Matrix[number_require_traceability_bytes]
```

If the MPT Cluster system is unsuccessful in accessing the traceability data then it shall generate and send the return_status message with a 54 in the status field. Receipt of the Req_Trace_Return message by the MPT Interface system shall cause the RT_Matrix data to be displayed on the Main screen.

```
Req_Traceability_write_privilege_Request {   char message = 109,
                                             char mac_address [12],
                                             char organization_name[32],
                                             char user_name[32],
                                             char password[20],
                                             char member[32],
                                             bool chptr_write_privileges [7],
                                             char document_name [32],
                                             char member_name[32]
}
```

The Requirement Traceability Matrix pop-up 350 shall remain until the Submit button 352 is selected. The other requirement traceability fields shall be filled in by selecting the required item on one of the other screens followed by double-clicking on the needed row of the Requirement Traceability Matrix, such as row 354. This is detailed in the High Level Design, Detailed Design, Code Element, and Test Plans & Procedures sections. Once entered, the matrix 110 maintains links allowing a click on a matrix element, such as High Level Design 356, to open a window directly containing that portion of the design database 158.

```
Req_Traceability_Change_Request {    char message = 108,
                                     char mac_address [12],
                                     char organization_name[32],
                                     char user_name[32],
                                     char password[20],
                                     char document_name [32],
                                     int number_require_traceability_bytes,
                                     char RT_Matrix[number_require_traceability_bytes]
}
```

The messages displayed on the Requirement Traceability Screen include:
1. Privileges Successfully Submitted
2. Privilege Submission Unsuccessful
3. Requirement Traceability Successfully Changed
4. Requirement Traceability Not Changed Error
5. Different Machine Used High Level Design The MPT model high-level design method is a graphically-based, concept-analysis model consisting of four components: Process/Control/Data/Signal Decomposition Analysis (DA), Control System Analysis (CSS), Data Dictionary (DD), and Signal Dictionary (SD). All of the high-level design components work together to form the design. Each component is performed in its own pop-up screen, where appropriate changes on one screen will cause changes on the other screens as illustrated herein. Each component of the DA and the CSS are identified with both a name, which specifies the task performed, and a tuple, which indicates the hierarchical location of the component. This tuple value is used by the Requirements Traceability Matrix to trace the design to the requirements.

The purpose of high-level design is to completely separate the processing aspects of a task from the control aspects of that same task. The separation is performed in a hierarchical manner until no such separation is possible. What is left at the lowest level of decomposition is a series of diagrams whose components are either pure linear code blocks or simple state machines that represent the control and sequencing of the code blocks. The simple state machines can be view separately or as a whole, showing the entire task control complexity as a single diagram. Control is eventually represented in software as some flow control statement: loops, go-tos, if-then-elses, or subroutine calls. The code blocks are simple linear data transformations/displays/movements. Because the code blocks are linear, their functionality is easy to grasp. Taken together, these diagrams represent a great simplification of the task because every aspect of the task can be viewed as a simple local structure.

Any member of the developing organization can view the high-level design; however, only those members who are authorized by an administrator can add or change the high-level design.

Authorizing High Level Design Members

Figure 10:
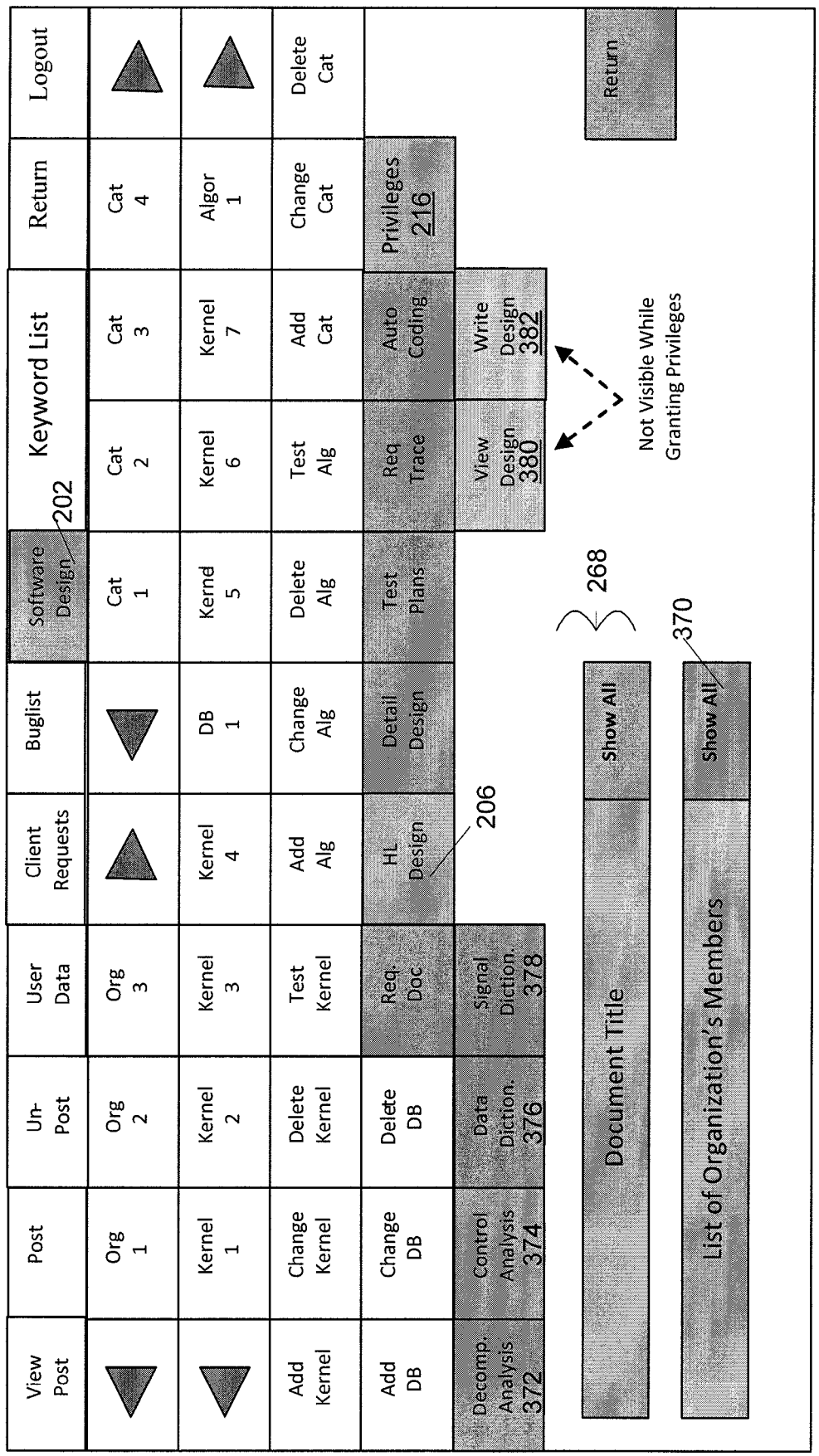
FIG. 10 is an illustration of a screen display of a workstation of the system, illustrating assigning privileges for high level design.

In order to grant write privileges to a member, with reference to FIG. 10, the administrative member selects the Software Design, High Level Design and Privileges buttons. Granting write privileges for High Level Design to a member follows a procedure very similar to that of granting write privileges to Requirements as previously discussed with reference to FIG. 5, except the High Level Design button 206 is selected, and one of the High level Design item buttons Decomp. Analysis 372, Control Analysis 374, Data Dictionary 376, and Signal Dictionary 378 are selected.

This selection is followed by the administrator entering the Document Title either by directly entering the title or by selecting the title from a list of valid titles. The document title must be the same as the one used for the requirements document. Next, a member is selected by clicking on a pull-down list 370 of members, followed by the selection of the high-level design components for which the member has write privileges. Selecting the Software Design button 202, the HL Design button 206, the document title 268, the member name from the list 370, the design items (Decomposition analysis (Decomp. Analysis) 372, Control Analysis 374, Data Dictionary 376, and/or Signal Dictionary 378) followed by the Privileges button 216 shall cause the MPT Interface system to generate and send the HLD_Write_Privilege_Request message to the MPT Cluster system.

```
HLD_Write_Privilege_Request {    char message = 90,
                                 char mac_address [12],
                                 char organization_name[32],
                                 char user_name[32],
                                 char password[20],
                                 bool HLD_write_privileges [4],
                                 char document_name [32],
                                 char member_name[32]
}
```

If the If a high-level design component has already been selected, then re-selecting it will cause write privileges for that component to be rescinded.

Upon receipt of the HLD_Write_Privilege_Request message the MPT Cluster system shall attempt to modify the HLD Write Privilege information with the current document name in the database. If the MPT Cluster is successful in modifying the HLD Write Privilege information then it shall send the return_status message containing a zero in its status field to the MPT Interface system. If the MPT Cluster system is unable to modify the HLD information in the database then it shall send the return_status message containing a 55 in its status field to the MPT Interface system.

Viewing High Level Design

Any member of an organization can view the components of a high-level design, with a screen resembling that of FIG. 11 except the member's list 370 and privilege button 216 are suppressed. This is accomplished by the member selecting the Software Design, the HL Design, and entering or selecting the Document Title field, followed by selection of the View Design 380 button. Selection of the View Design button shall cause the MPT Interface system to generate and send the HLD_Data_Request message to the MPT Cluster system.

```
HLD_Data_Request {    char message = 91,
                      char mac_address [12],
                      char organization_name[32],
                      char user_name[32],
                      char password[20],
                      char document_name [32],
}
```

Upon receipt of the HLD_Data_Request message the MPT Cluster system shall attempt to access the HLD data for the current document from the database. If the MPT Cluster system is successful accessing the HLD data then it shall first send the return_status message containing a zero in its status field followed by the HLD_Data_Return message.

```
HLD_Data_Return {    char message = 92,
                     char mac_address [12],
                     char organization_name[32],
                     char user_name[32],
                     char password[20],
                     char document_name [32],
                     char document_write_privilege [32],
                     int number_decomp_bytes,
                     char Decomp_analysis[number_decomp_bytes],
                     int number_data_dictionary_bytes,
                     char
                     data_dictionary[number_data_dictionary_bytes],
}
```

If the MPT Cluster system is un-successful accessing the HLD data then it shall send the return_status message with a 56 in its status field to the MPT Interface system.

Creating High Level Design Components

Any authorized member of an organization can open for writing the components of a high-level design. This is accomplished by the member selecting the Software Design 202, the HL Design 206, selecting the correct document in the Document Title field 268, selecting the component to view, and finally, selecting the Write Design 382 buttons. Entering the Write Design button shall cause the MPT Interface system to generate and send the HLD_Data_Request message. Upon receipt of the HLD_Data_Request message the MPT Cluster system shall attempt to access the HLD data for the current document from the database. If the MPT Cluster system is successful accessing the HLD data then it shall first send the return_status massage containing a zero in its status field followed by the HLD_Data_Return message.

Decomposition Analysis

Figure 12:
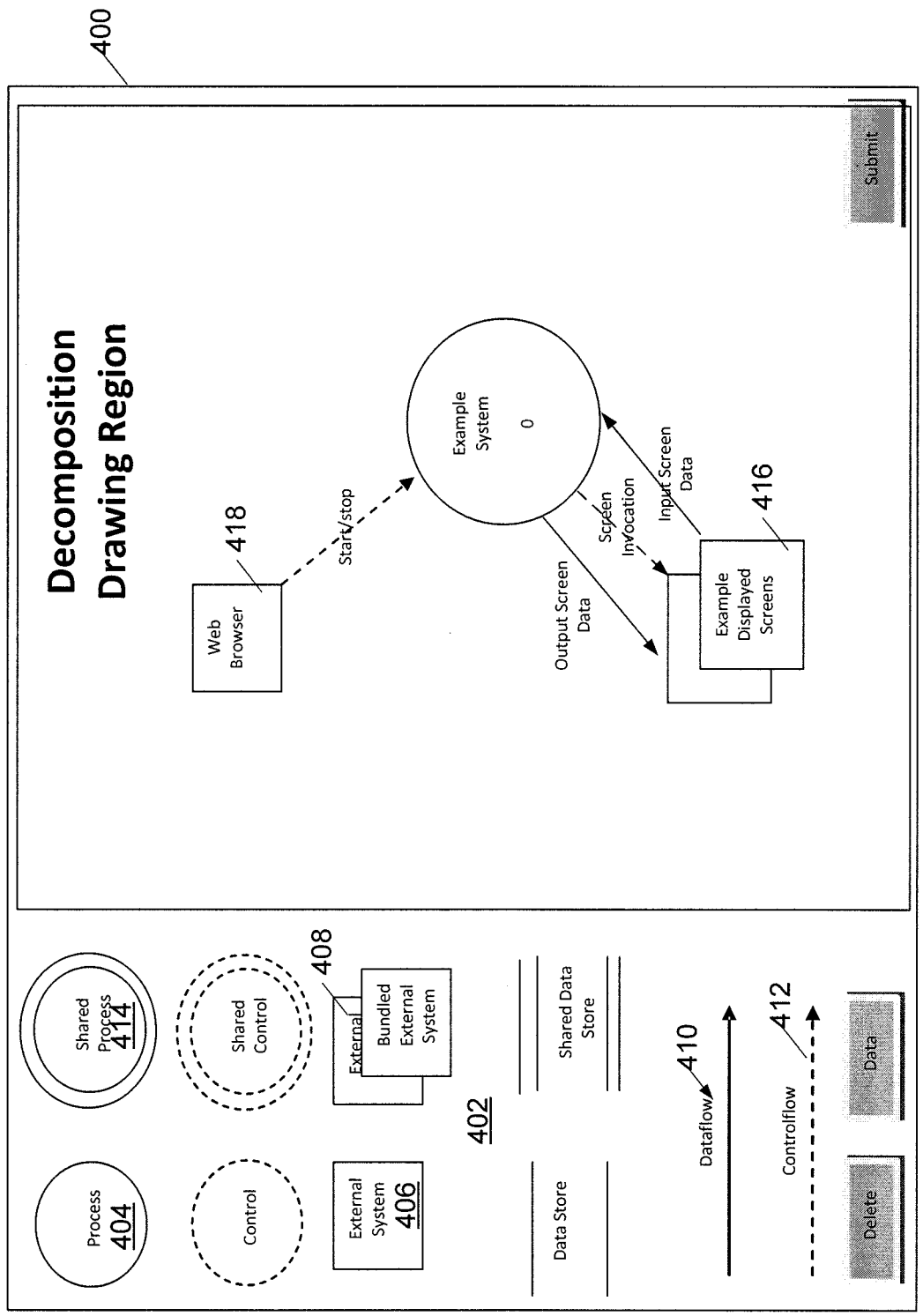

Decomposition analysis forms the heart of high-level design. Any member with write privileges can access this component by selecting the Write Design button then the Decomp. Analysis button 372 shall cause the MPT Interface system to display the decomposition data in the Decomposition pop-up screen 400 as illustrated in FIG. 12, together with a menu 402 of selectable symbols for entry of the decomposition data.

The pop-up Decomposition Drawing screen shall have two parts: the objects region and the drawing region. The objects region shall contain all of the possible design objects. These objects are dragged from the objects region then dropped into the drawing region. The cursor placed at the edge of the drawing region shall cause the prospective drawing region to move in the direction corresponding to the cursor's placement, revealing the hidden drawing region area.

The Data Dictionary table can be displayed either from selecting a dataflow or by the member left-clicking the Data button.

Selecting any object on the decomposition drawing table followed by an authorized member left-clicking the Delete button shall cause that object to be deleted.

The topmost level of the decomposition drawing region shows the entire system at a glance; that is, all signals and data from/to all systems that are external to the current system are described. At the topmost level (level 0), only five types of objects shall be able to be dragged and dropped: Process 404, External 406, Bundled External 408, Data flow 410, and Control flow objects 412. FIG. 12 illustrates level 0.

There are several components of the Level-0 Decomposition Drawing region. The first is the process bubble with its associated name, tuple, view number, and description. The associated name is the name of the product and comes from the Document Title Name field entered on the Write High Level Design screen. An authorized member can change the process bubble name by single left-clicking the process bubble then entering the new name. This is the first object placed on the drawing region and is placed there automatically by the system. The tuple value (the red zero on the process bubble) is automatically set to zero on the level-0 region. The view number (the red ½, meaning view 1 of two views showing) allows the member to know which process bubble view is showing. Rotating the process bubble allows more input and output data/control flows to be connected without it becoming too overloaded with lines. Rotating the bubble view is accomplished by selecting either the left or right arrowhead associated with the view number. Double left-clicking the view number adds another view. Double right-clicking the view number removes an unused view. The authorized member accesses the unused view (only center bubble showing) then double right-clicks the center bubble.

Figures 13, 15:
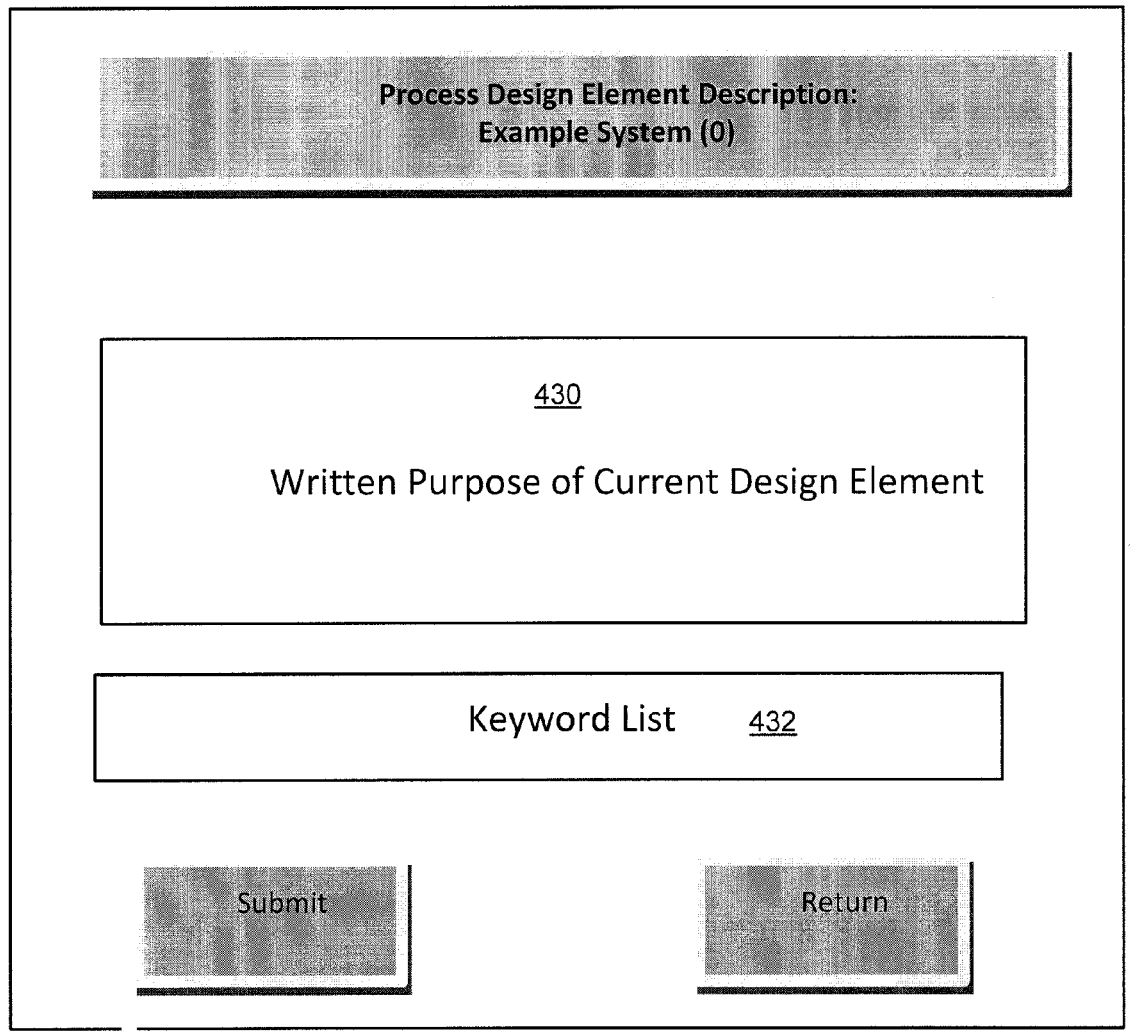
FIG. 13 is an illustration of a bubble-description popup for entry of details of decomposition analysis.
FIG. 15 is an illustration of a dataflow descriptor.

Single right-clicking a bubble by an authorized member shall cause the process bubble description pop-up FIG. 13 to be displayed. There are two parts to the process bubble description the purpose 430 and the keyword-list 432. The purpose is a prose description of the design element created as a human readable description. The keyword-list is a list of descriptive words used to allow the design element to be found using a search engine.

Once the purpose and keyword-list have been entered, the member shall select the Submit button to continue adding design elements. Filling in the design purpose allows the system to automatically generate the detailed design from entry pseudocode. Selection of the return button on the process design element pop-up shall return control to the calling screen.

The second component of a level-0 decomposition drawing is the external system box 406. The authorized member must drag and drop the external system box where required. Once the external system box 406 is properly placed on the decomposition drawing region, for example placed external system box 418, its name can be entered on the box as shown. Entering a name on the external system box 406 is accomplished by the member left-clicking inside of the box then typing the name into the box. To delete an external system box, the member left-clicks the external system box followed by selecting the Delete button.

Figure 14:
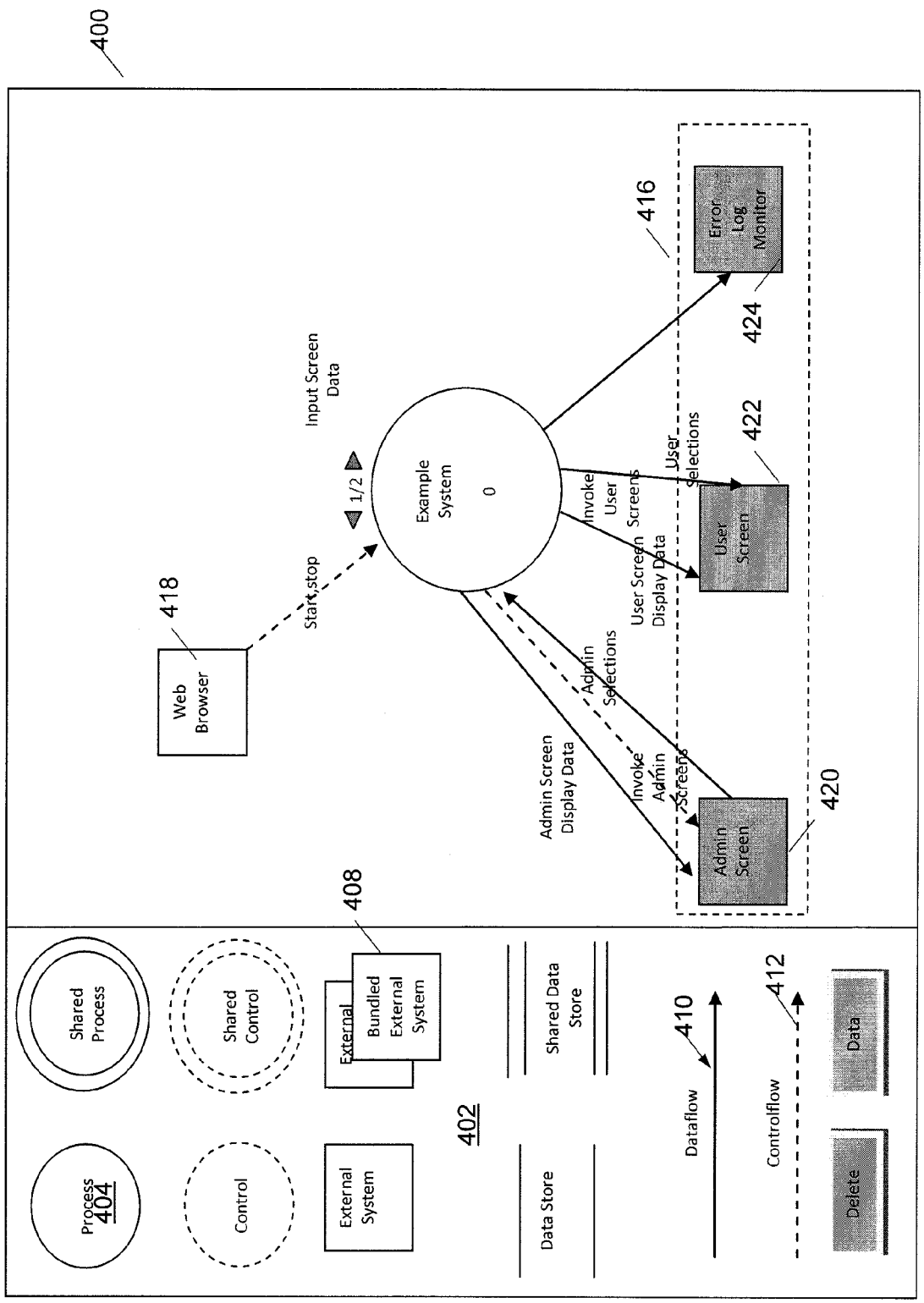
FIG. 14 is an illustration of a bubble-description popup for decomposition analysis with a Bundled External System box shown unbundled.

The third component of a level-0 decomposition drawing is the bundled external system box 408. A bundled external system box contains multiple external system boxes. Double left-clicking on a placed bundled external system box 416 shows the constituent external system boxes 420, 422, 424 of the bundled external system box 416. Double left-clicking on a bundled external system box a second time hides the constituent external system boxes again. This is shown in FIG. 14.

In order to bundle multiple external systems, the authorized member first drags-and-drops the bundled external system box to the decomposition drawing region. Once properly placed, the member drags-and-drops the appropriate number of unbundled external system boxes. Finally, the member first right-clicks the unbundled external system box then the right-clicks the bundled external system box, associating the unbundled with the bundled external system box. Once associated, the unbundled external system box is not displayed until it is displayed through the bundled external system box. Entering a name on the bundled external system box is accomplished by the member left-clicking inside of the box then typing the name into the box. To delete a bundled external system box, the member left-clicks the bundled external system box followed by selecting the Delete button. Once deleted, all of the external system boxes that comprise the deleted bundled external system box are displayed.

The fourth component of the level-0 decomposition drawing is the dataflow arrow. The dataflow arrow shows the direction of the dataflow. The data can flow either to or from an external system box. A bundled external system box combines all input dataflows from all constituent external system boxes into a single flow. Similarly, all output dataflows from all constituent external system boxes are combined into another single flow. These combined dataflows are called bundled dataflows and require names of their own. Double left-clicking a dataflow allows the authorized member to name the flow simply by typing in the name.

Double right-clicking a dataflow displays the contents of that flow, as illustrated in the dataflow descriptor of FIG. 15. If the dataflow is a bundled dataflow then the revealed contents are the other flows. Double right-clicking the revealed dataflows returns the view to the dataflow bundle view.

If the double right-clicked dataflow is not a bundled dataflow then the Data Dictionary Table is displayed. The Data Dictionary Table shows the flow types, flow names, unit names, and the unit types that make up the dataflow and allows an authorized member to change those data fields. Both a flow name and a unit name must be unique. The valid data unit types are shown in Table 2:

TABLE 2

| Valid Unit Types | |
| --- | --- |
| Variable Type Name | Number of Bytes |
| SIGNAL | n/a |
| #define | n/a |
| #include | n/a |
| #type | n/a |
| Char | 1 |
| Auto Char | 1 |
| Static Char | 1 |
| Extern Char | 1 |
| Register Char | 1 |
| Unsigned Char | 1 |
| Auto Unsigned Char | 1 |
| Static Unsigned Char | 1 |
| Extern Unsigned Char | 1 |
| Register Unsigned Char | 1 |
| Int | 4 |
| Auto Int | 4 |
| Static Int | 4 |
| Extern Int | 4 |
| Register Int | 4 |
| Unsigned Int | 4 |
| Auto Unsigned Int | 4 |
| Static Unsigned Int | 4 |
| Extern Unsigned Int | 4 |
| Register Unsigned Int | 4 |
| Short | 2 |
| Auto Short | 2 |
| Static Short | 2 |
| Extern Short | 2 |
| Register Short | 2 |
| Short Int | 2 |
| Auto Short Int(eger) | 2 |
| Static Short Int(eger) | 2 |
| Extern Short Int(eger) | 2 |
| Register Short Int(eger) | 2 |
| Unsigned Short Int(eger) | 2 |
| Auto Unsigned Short Int(eger) | 2 |
| Static Unsigned Short Int(eger) | 2 |
| Extern Unsigned Short Int(eger) | 2 |
| Register Unsigned Short Int(eger) | 2 |
| Long | 8 |
| Auto Long | 8 |
| Static Long | 8 |
| Extern Long | 8 |
| Register Long | 8 |
| Long Int(eger) | 8 |
| Auto Long Int(eger) | 8 |
| Static Long Int(eger) | 8 |
| Extern Long Int(eger) | 8 |
| Register Long Int(eger) | 8 |
| Unsigned Long Int(eger) | 8 |
| Auto Unsigned Long Int(eger) | 8 |
| Static Unsigned Long Int(eger | 8 |
| Extern Unsigned Long Int(eger) | 8 |
| Register Unsigned Long Int(eger) | 8 |
| Float | 4 |
| Auto Float | 4 |
| Static Float | 4 |
| Extern Float | 4 |
| Register Float | 4 |
| Unsigned Float | 4 |
| Auto Unsigned Float | 4 |
| Static Unsigned Float | 4 |
| Extern Unsigned Float | 4 |
| Register Unsigned Float | 4 |
| Double | 8 |
| Auto Double | 8 |
| Static Double | 8 |
| Extern Double | 8 |
| Register Double | 8 |
| Unsigned Double | 8 |
| Auto Unsigned Double | 8 |
| Static Unsigned Double | 8 |
| Extern Unsigned Double | 8 |
| Register Unsigned Double | 8 |

C-language-style structures can also be added to the system using the type definition. To add a new data field, the authorized member selects an open row in the Data Dictionary table and enters the new unit name. The flow type is automatically set to DATA, and the data flow name is automatically entered from the dataflow name. Next, a valid data type for the data name is selected. When completed, the Data Dictionary table is double right-clicked to return to the dataflow view. On level 0, a dataflow can only be connected from an external system/bundled external system to the level-0 process bubble or from the level-0 process bubble to an external system/bundled external system. Because external systems are not part of the current design, connections between external systems have no meaning to the current system.

The fifth and last component shown on the level-0 decomposition drawing is the Controlflow arrow. A controlflow arrow represents some signal and its direction to or from between some external system and the current system. In lower-level drawings, the signals can be emitted from process bubbles or other control bubbles as well as external systems. Control can be an invocation (invoking a display screen, external system, etc.), a message (the existence of some message type acting as a signal), or a hardware signal.

The control can flow either to or from an external system box. A bundled external system box combines all input controlflows from all constituent external system boxes into a single flow. Similarly, all output controlflows from all constituent external system boxes are combined into another single flow. These combined controlflows are called bundled controlflows and require names of their own.

Double left-clicking a controlflow allows the authorized member to name the flow simply by typing in the name. Double right-clicking a controlflow displays the contents of that flow. If the controlflow is a bundled controlflow then the revealed contents are the other controlflows. Double right-clicking the revealed controlflows returns the view to the controlflow bundle view.

If the double right-clicked controlflow is not a bundled controlflow then the Data Dictionary Table is displayed. To add a new unit field, the authorized member selects an open row in the Data Dictionary table and enters the new unit name. The flow type is automatically set to CONTROL, the flow name is automatically entered from the controlflow name and the unit type is automatically set to SIGNAL. When completed, the Data Dictionary table is double right-clicked to return to the controlflow view.

```
HLD_Data_Dictionary_Change_Request {   char message = 115,
                                        char mac_address [12],
                                        char organization_name[32],
                                        char user_name[32],
                                        char password[20],
                                        char document_name [32],
                                        int number_decomp_bytes,
                                        int number_data_dictionary_bytes,
                                        char
                                        data_dictionary[number_data_dictionary_bytes],
                                        int number_signal_bytes,
}
```

Selection of the Submit button on the Decomposition Drawing screen shall cause the MPT Interface system to generate and send the HLD_Data_Change_Request message to the MPT Cluster system.

```
HLD_Data_Change_Request {   char message = 93,
                             char mac_address [12],
                             char organization_name[32],
                             char user_name[32],
                             char password[20],
                             char document_name [32],
                             int number_decomp_bytes,
                             char Decomp_analysis[number_decomp_bytes],
                             int number_control_bytes,
                             char Control_analysis[number_control_bytes],
                             int number_data_dictionary_bytes,
                             char
                             data_dictionary[number_data_dictionary_bytes],
                             int number_signal_bytes,
                             char signal_dictionary
                             [number_signal_dictionary_bytes]
}
```

Upon receipt of the HLD_Data_Change_Request message the MPT Cluster system shall determine that the requesting user is authorized and if so update the HLD database. The MPT Cluster system being able to update the HLD database shall cause it to send the return_status message containing a zero in the status field to the MPT Interface system. The MPT Cluster system not being able to update the HLD database shall cause it to send the return_status message containing a non-zero in the status field to the MPT Interface system.

In addition decomposition levels lower than level-0 have five additional objects: shared process, control, shared control, data store, and shared data store. Since there can be additional objects plus multiple process bubbles, additional rules are required for the controlflows and dataflows.

1) A dataflow or bundled dataflow can only connect the following: external system box/process, bundled external system box/process, external system box/shared process, external bundled external system box/shared process, data store/process, shared data store/process, data store/shared process, shared data store/shared process
2) A controlflow or bundled controlflow can only connect the following: external system box/process, bundled external system box/process, external system box/shared process, bundled external system box/shared process, external system box/control, bundled external system box/control, external system box/shared control, bundled external system box/shared control, control/control, control/shared control.

If a process bubble is double left-clicked then any components that make up that process are displayed. If there are no components then a central control bubble is displayed along with all of the external system boxes associated with the level of the process bubble that was double left-clicked. The dataflows and controlflows attached to the external systems and the bundled external systems are not attached to any bubble.

The level below level 0 is level 0.0 which is the first level that can contain all of the design objects. Before adding other design objects to the decomposition drawing region, the member must first enter the name and description of the Level 0.0 control bubble.

Figure 16:
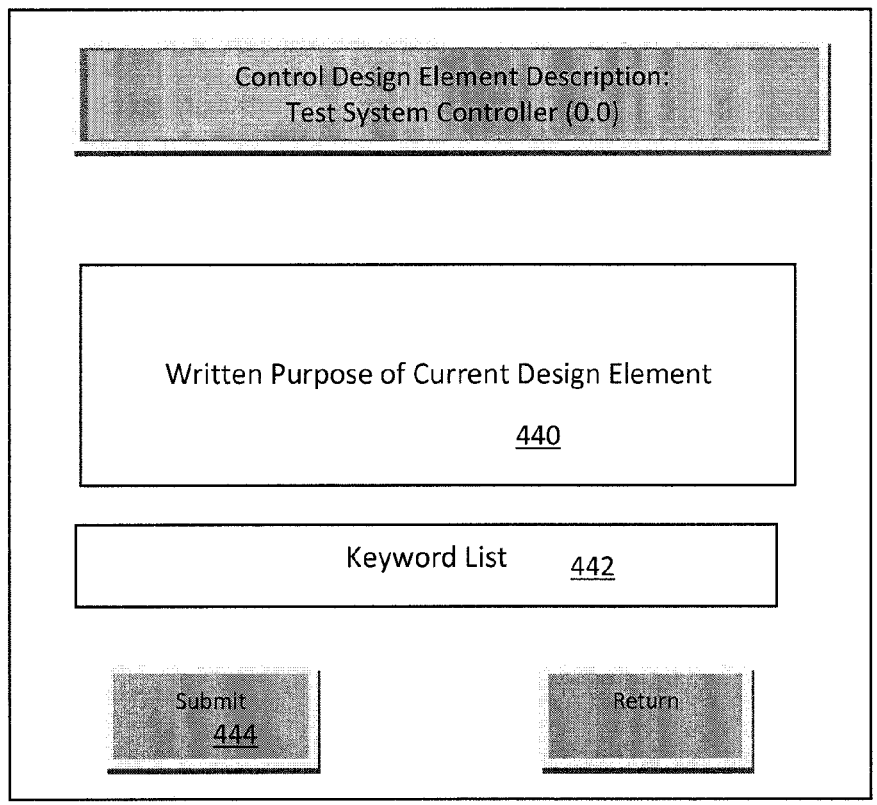
FIG. 16 is an illustration of a bubble-description popup for entry of details of a control bubble of decomposition analysis.

An authorized member can add or change the control bubble name by single left-clicking the control bubble then entering the new name. Single right-clicking a control bubble by an authorized member displays the control bubble description pop-up as illustrated in FIG. 16, which gathers the purpose of the control bubble. There are two parts to the control design element description, the purpose 440 and the keyword-list 442. The purpose is prose that provides a human readable description of current design element. The keyword-list is a list of descriptive words used to allow the current element to be accessed via a search engine.

Figure 17:
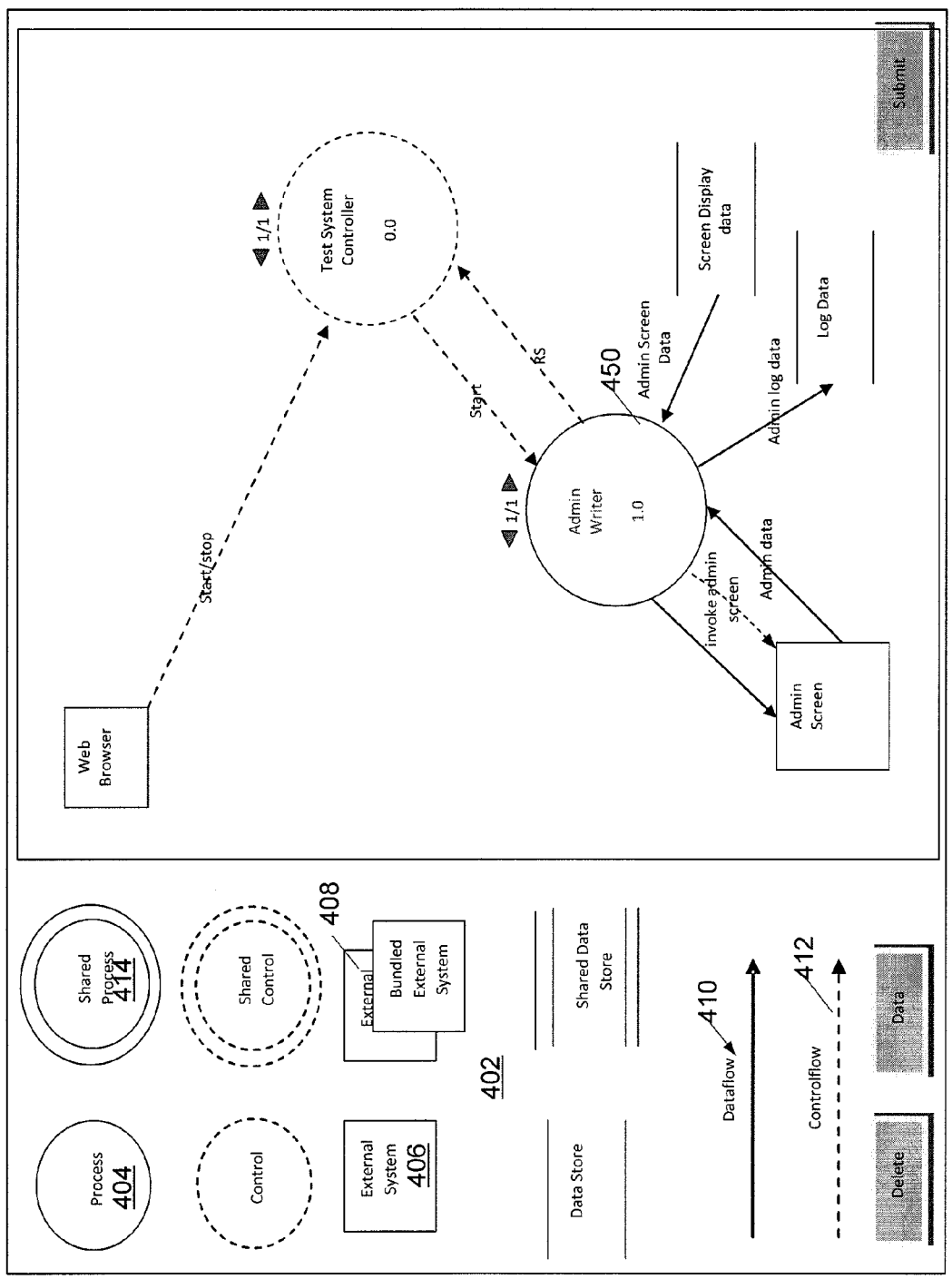
FIG. 17 is an illustration of second level design in a control bubble.

Once the purpose has been written, the member selects the Submit button 444 to continue adding design elements. Writing down, in English, the control bubble's purpose allows the system to automatically generate the detailed design (pseudo code). The MPT pseudo code will be used by the code generator as comments to the code. Once the purpose has been entered and the Submit button 444 selected, the requirement traceability matrix is updated with the tuple corresponding to the described element being automatically placed in the detailed design column of the matrix. Other design elements can now be added. Each element is highlighted in red until it has a name and description and is connected to some other element (with the exception of the system-generated central bubble, which does not require connection). FIG. 17 shows the addition of process bubbles 450 to the decomposition drawing.

When adding a new process bubble 450, the tuple value is computed automatically by the system. This is performed as a function of the level and the order in which the bubble is placed. Once the name and description have been added to the process bubble, the authorized member can connect that bubble to other objects. All process bubbles must be connected to the central bubble, allowing the control bubble to invoke the process bubble, as an invocation is a control feature. The loose dataflows and controlflows from some external system can be connected to the process bubble. To allow a dataflow to only use part of its data in a bubble, the authorized member connects the proper dataflow to the proper bubble then adds the required dataflow information. In the case where the dataflow already exists and multiple bubbles are to be attached via that dataflow, the existing flow is converted, by the authorized member, to a bundled dataflow with the dataflow containing the correct data going to the proper bubble. Within a bundled dataflow, a component flow can be referenced by using dot notation. Dot notation gives the name of the bundled dataflow followed by a "dot" followed by the component dataflow item. Below shows dot notation used to reference example component dataflows:

The example above shows that within the AdminScreen-Data bundled dataflow, there is another dataflow, called the LoginScreenData dataflow, accessed. Data units can be directly referenced from a dataflow using parenthesis notation. Parenthesis notation encloses the name of the referenced data or control unit in parenthesis. Parenthesis notation can also be used with dot notation to reference items within a bundled dataflow. Multiple units can be referenced by separating the unit names by commas. Finally, variables can be C-language-style structures and arrays.

Controlflows behave differently from dataflows: There are no bundled controlflows, the signal that activates the control is placed on the flow itself, and there is no internal controlflow structure. Below shows the signal-naming conventions of a control flow:

1) Any data unit can be used as control. The data unit name and one of the following conditional indicators can be used to show the condition of the signal that will call another bubble: =, !=, >, <, >=, <=. The format for a signal is (data_unit_name conditional data_unit_value). A data unit value is a value of the same type as the data unit name used to determine that the signal is active.
2) There is a special state vector called the tuple-vector that always identifies the originating state of the state-transition vector. The special tuple-vector either exists or does not exist. When the special tuple-vector is on a controlflow, the last state entered must be checked for that value if it is on a controlflow exiting a central bubble, or is the value of the last state if it appears on a controlflow entering a central bubble. The tuple-vector can have a place-holder allowing the system to ignore lower-order tuple values. The format of the tuple-vector is "fx.y.z . . . ", meaning the letter "f" followed by an integer value, possibly followed by a "." followed by another value, and so on. The place-holder value is an "X" in place of any of the integer values with no further dot-integer values following.
3) Multiple state-transition vectors can be grouped together on a single controlflow using parenthesis along with "and" symbols (&) and "or" symbols (^).

Double left-clicking a process bubble gives access to lower design levels, as shown below The central control bubble of the lower level is automatically connected to the control bubble of the upper level. The authorized member can add, change, or delete the control flow information between the control bubbles of different levels. Changes made at one level will automatically be made at all other levels. All data stores that are defined at a higher level are shown as shared data stores in the lower level.

The data stores and shared data stores have data that is transmitted to/from them via one or more process bubbles. Single left-clicking a data store or shared-data store allows an authorized member to provide a name to the store. Double left-clicking a data store allows the data store's data values to be displayed in the data store table:

TABLE 3

DATA STORE FORMAT
Data Store: Example

| Data Unit Name | Input Dataflow Name | Output Dataflow Name |
| --- | --- | --- |

If the data units in a store do not have both a source (Input dataflow name) and a destination (output dataflow name) then an authorized member can add already existing dataflow names to the either the input or output dataflow name fields. If data is received from or sent to multiple data flows then the names of all dataflows are included in the Data store:

TABLE 4

EXAMPLE MULTIPLE INPUT AND OUTPUT DATAFLOWS
ATTACHED TO VARIABLES
Data Store: Example

| Data Unit Name | Input Dataflow Name | Output Dataflow Name |
| --- | --- | --- |
| ExampleData1 | InFlow1, Inflow2 | OutFlow1 |
| ExampleData2 | Inflow1 | OutFlow1, OutFlow2 |

Any data unit that does not have at least one input dataflow and one output dataflow is considered a deficient data unit and is highlighted in red.

Additional dataflow names and unit names can be added by the authorized member selecting (single left-click) an empty row followed by the new data being placed in the empty fields. Selecting the Submit button causes the control to be returned to the decomposition drawing screen. Any Input dataflow or input data unit without a corresponding output dataflow and data unit is highlighted with red, as is the data store symbol on the decomposition drawing screen. An alternative to a dataflow name is the symbol "N/A". An "N/A" placed in the input dataflow name allows the system to ignore the fact that the data unit was not placed in the store by the current system. An "N/A" placed in the output dataflow name allows the system to ignore the fact that the data unit is not consumed by the current system.

TABLE 5

EXAMPLE OF SELECTIVE USE OF DATAFLOWS WITH A DATA
UNIT
Data Store: Example

| Data Unit Name | Input Dataflow Name | Output Dataflow Name |
| --- | --- | --- |
| ExampleData1 | N/A | OutFlow1 |
| ExampleData2 | Inflow1 | N/A |
| ExampleData3 | N/A | N/A |

Below are the messages displayed on the High Level Design Screen,
1. Privileges Successfully Submitted
2. Privilege Submission Unsuccessful
3. Data Dictionary Successfully Changed
4. Data Dictionary Not Changed Error
5. Data Store Successfully Changed
6. Data Store Not Changed Error
7. Design Element Purpose Successfully Changed
8. Design Element Purpose Not Changed Error
9. Data Decomposition Successfully Changed
10. Data Decomposition Not Changed Error
11. Different Machine Used Decomposition Element Rules There are seven types of decomposition elements: Signals, Stores, Process-Bubbles (PB), Control-Bubbles (CB), Terminators (T), Dataflows (DF), and Controlflows (CF).

There are three types of signals: Invoke, Release, and Standard.

Invoke Signal

An invoke signal causes the activation of a store, PB, or CB. Once a store is activated it can receive and send data. The invocation of a PB or CB causes control to shift to those elements.

Release Signal

A release signal causes a store to be deactivated and cannot be used on either a PB or a CB.

Standard Signal

A standard signal is any variable whose value is used to transfer control. For example a CB can use a standard signal to transfer control to either another CB or a PB.

A store holds data from input dataflows and releases data to output dataflows. A Store must be invoked prior to use and must be released after use.

Allowed Data Store Activities

The purpose of a data store is the storage and release of information to and from various process-bubbles. As such control is not associated with data stores with the exception of invocation and release.
 1) Receive data from an input dataflow connected to a process-bubble
 2) Send data on an output dataflow connected to a process-bubble
 3) Receive an invoke signal from a controlflow connected to a control-bubble
 4) Receive a release signal from a controlflow connected to a control-bubble Disallowed Data Store Activities Any activity that is not associated with the storage and release of information to process-bubbles or the invocation and release of the store itself is disallowed.
 1) Receive standard signal
 2) Send standard signal
 3) Send an invoke signal
 4) Send a release signal
 5) Receive data from an input dataflow connected to control-bubble
 6) Send data to an input dataflow connected to a control-bubble
 7) Receive data from an input dataflow connected to a terminator
 8) Send data to an output dataflow connected to a terminator A process-bubble, adds data, changes data, deletes data, or moves data. There are several process-bubble behavior rules:

Allowed Process-Bubble Activities

Since a process-bubble manipulates data, all activities associated with sending and receiving data to various stores is allowed. Further, since a data element can also serve as a signal, activities associated with various signals are also allowed.
 1) send data to a data store using output dataflow
 2) receive data from a data store using input dataflow
 3) Send standard signals to control-bubbles
 4) Receive standard signals from control-bubbles
 5) Send standard signals to terminators
 6) Receive standard signals from terminators
 7) Send data to terminators
 8) Receive data from terminators
 9) Invoke transient terminators
 10) Release transient terminators Disallowed Process-Bubble Activities Direct process-bubble to process-bubble communication is not as this implies messaging between processes. Message between processes means that separate systems are in communication; thus, rather than process-bubble to process-bubble the proper organization would be process-bubble to terminator. By definition only transient terminators can be invoked and released thus invocation and release of standard terminators is disallowed.
 1) Invoke process-bubble
 2) Release process-bubble
 3) Invoke control-bubble
 4) Release control-bubble
 5) Invoke data stores
 6) Release data stores
 7) Receive data from control-bubble
 8) Send data to control-bubble
 9) Receive data from process-bubble
 10) Send data to process-bubble
 11) Send control to a data store
 12) Receive control from a data store
 13) Invoke a standard terminator
 14) Release a standard terminator Process-Bubble Completion Rules Process-bubbles can be decomposed into lower level design elements. Since the purpose of this design model is the complete separation of control from process, this implies that the lowest level process-bubble will only perform a single activity (multiple activities are composed using control). Any detectable multiple activities found for a process-bubble is an indication that the process-bubble can be further decomposed. The opposite of further decomposition indication is bubble incompleteness indication. Below are the rules that determine both conditions.
 1) Is not fully decomposed if attached to multiple terminators
 2) MUST receive at least one standard signal
 3) Is not fully decomposed if receives more than one standard signal
 4) Is not fully decomposed if sends more than one standard signal
 5) MUST receive at least one input dataflow and send at least one output dataflow
 6) All inputs and outputs of current process-bubble must appear in the parent level bubble, but can be part of a bundle in at the parent level.

A control-bubble controls the processing flow of a system. There are several control-bubble behavior rules:

Allowed Control-Bubble Activities

Control has three components, the transmission and receipt of standard signals, the transmission and receipt of invocation of data stores and transient terminators, and the transmission and receipt of data store and transient terminator releases.
1) Send standard signals to control-bubbles
2) Receive standard signals from control-bubbles
3) Send standard signals to process-bubbles
4) Receive standard signals from process-bubbles
5) Send standard signals to terminators
6) Receive standard signals from terminators
7) Receive invocation signals from terminators
8) Receive release signals from terminators
9) Invoke transient terminators
10) Release transient terminators
11) Invoke data stores
12) Release data stores Disallowed Control-Bubble Activities Because control-bubbles only transmit or receive signals, anything not having to do with the transmission or receipt of signals is disallowed.
1) send data to a data store using
2) receive data from a data store
3) Invoke process-bubble
4) Release process-bubble
5) Invoke control-bubble
6) Release control-bubble
7) Receive data from control-bubble
8) Send data to control-bubble
15) Receive data from process-bubble
16) Send data to process-bubble There are two types of terminators, standard and transient. A standard terminator is equivalent to another, outside system that the current system interfaces with. A transient terminator is a terminator that can be invoked and released. Examples of transient terminators include: display screens or another process.

Allowed Standard Terminator Activities

Figure 18:
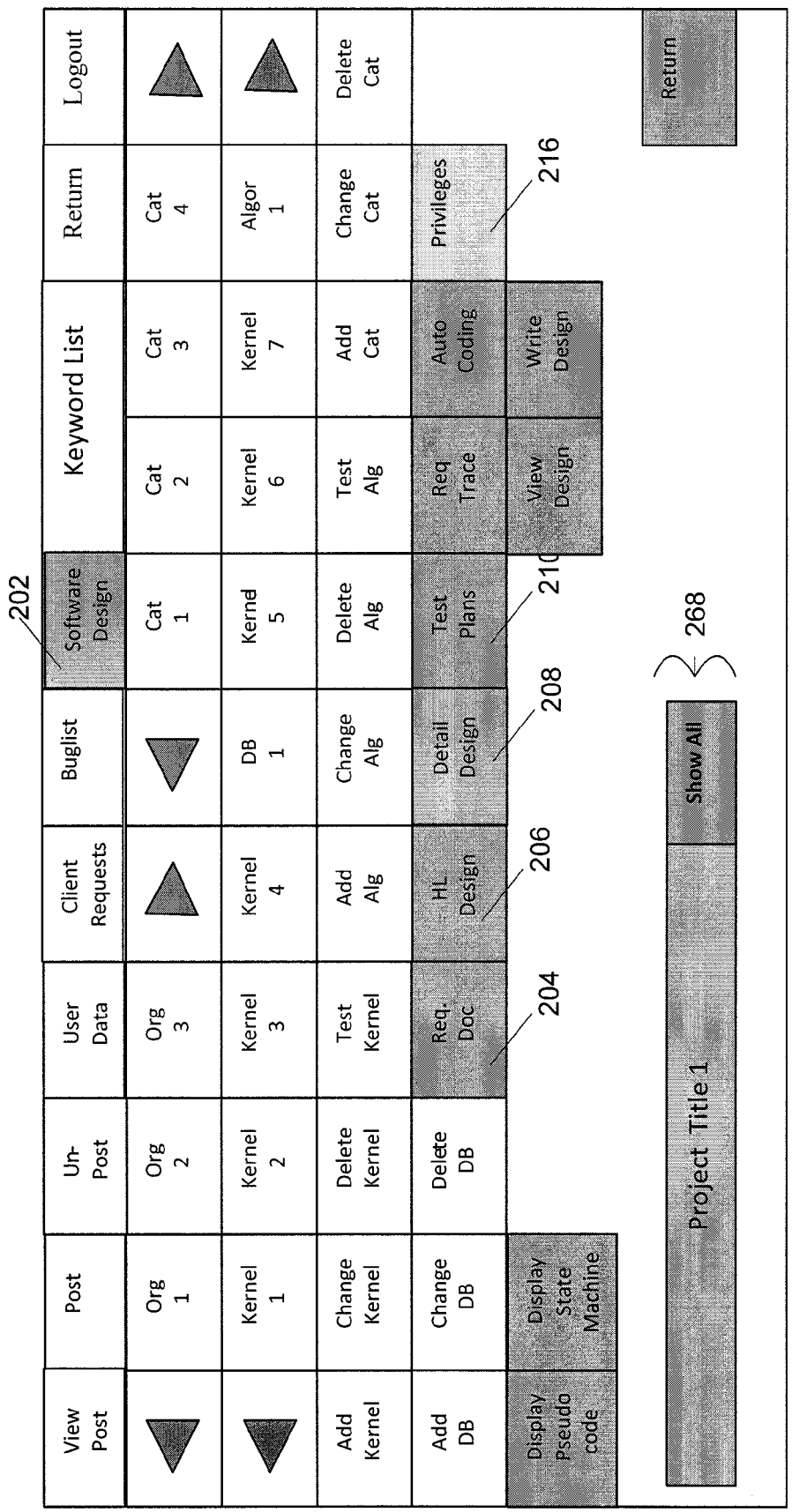
FIG. 18 is an illustration of opening detail design to view or modify pseudocode or state machines.

A standard terminator is fixed in relationship to the current system. That is, these terminators are always available to send or receive data or signals from or to either process-bubbles or control-bubbles. Anything to do with moving data or signals between a standard terminator and process or control-bubbles is allowed
1) Send standard signals to process-bubbles
2) Receive standard signals from process-bubbles
3) Send standard signals to control-bubbles
4) Receive standard signals from control-bubbles
5) Send data to process-bubbles
6) Receive data from process-bubbles
7) Invoke control bubbles
8) Release control-bubbles Disallowed Standard Terminator Activities Anything that does not have to do with moving data or signals between a standard terminator and a process or control-bubble is disallowed.
1) Send standard signals to terminators
2) Receive standard signals from terminators
3) Send invoke signals to terminators
4) Receive invoke signals from terminators
5) Send release signal to terminators
6) Receive release signals from terminators
7) Send data to terminators
8) Receive data from terminators
9) Send data to data stores
10) Receive data from data stores
11) Send data to control-bubbles
12) Receive data from control-bubbles
13) Receive invoke signals from control-bubbles
14) Receive release signals from control-bubbles
15) Receive invoke signals from process-bubbles
16) Receive release signals from process-bubbles
17) Receive invoke signals from data stores
18) Send invoke signals to data stores
19) Receive release signals from data stores
20) Send release signals to data stores Allowed Transient Terminator Activities The difference between a transient and a standard terminator is the fact that a transient terminator must be invoked and released. Everything that is allowed for a standard terminator is also allowed for a transient terminator, as well as the invocation and release signals from process and control-bubbles.
1) Send standard signals to process-bubbles
2) Receive standard signals from process-bubbles
3) Send standard signals to control-bubbles
4) Receive standard signals from control-bubbles
5) Send data to process-bubbles
6) Receive data from process-bubbles
7) Invoke control bubbles
8) Release control-bubbles
9) Receive invoke signals from process-bubbles
10) Receive release signals from process-bubbles
11) Receive invoke signals from control-bubbles
12) Receive release signals from control-bubbles Disallowed Transient Terminator Activities With the exception of receiving invoke and release signals from process- or control-bubbles everything disallowed for standard terminators is also disallowed for transient terminators.
1) Send standard signals to terminators
2) Receive standard signals from terminators
3) Send invoke signals to terminators
4) Receive invoke signals from terminators
5) Send release signal to terminators
6) Receive release signals from terminators
7) Send data to terminators
8) Receive data from terminators
9) Send data to data stores Detailed Design Detailed design explores the system at the component level rather than at the system level as in the high-level design. There are two parts to detailed design: the pseudo-code and state machine as illustrated in FIG. 18. The process bubbles decompose into pseudo-code whereas the control bubbles decompose into state machines.

MPT pseudo-code does not give step-by-step instructions on how some function works; instead, it provides information on what some function does. This information is from the descriptions provided by the authorized members in the various bubbles. The MPT state machine is a type of Hierarchical State Machine (HSM) and represents all of the control found in the system. The information found in the state machine comes initially from the control bubbles of the high-level design. Selecting the Software Design button 202, followed by the Detailed Design button 208, and entering the Project Title 268 allows the system find the correct detailed design to display.

Selecting the Display Pseudo Code button activates the pseudo-code option. Selecting the Display State Machine button activates the state-machine option.

In order to allow "write" privileges for detailed design, an administrator-level member selects the Software Design button, Detail Design button, the project title (document name), the member name, the Display Pseudo Code and/or Display State Machine buttons, and finally, the Privileges button. The selection of the Privileges button shall cause the MPT Interface system to generate and send the DD_Write_Privilege_Request message to the MPT Cluster system. This is similar to setting write privileges on other portions of the software design, so no separate figure will be provided.

```
DD_Write_Privilege_Request {    char message = 94,
                                char mac_address [12],
                                char organization_name[32],
                                char user_name[32],
                                char password[20],
                                bool HD_write_privileges [2],
                                char document_name [32],
                                char member_name[32]
}
```

Upon receipt of the DD_Write_Privileges_Request message the MPT Cluster system shall attempt to update the detailed design privileges database table. If the MPT Cluster system is successful in updating the detailed design database privileges table then it shall send the return_status message containing a zero in its status field to the MPT Interface system. If the MPT Cluster system is un-successful in updating the detailed design privileges database table then it shall send the return_status message containing a non-zero in its status field to the MPT Interface system.

Once any member has selected the Display Pseudo Code button followed by the View Design button then the MPT Interface system shall generate and send the DD_Pseudo_Code_Request message to the MPT Cluster system.

```
DD_Document_Request { char message = 95,
    char mac_address [12],
    char organization_name[32],
    char user_name[32],
    char password[20],
    char document_name [32],
}
```

Pseudocode

Upon receive of the DD_Pseudo_Code_Request message the MPT Cluster system shall attempt to extract the Pseudo code database table data for the current document name. If the MPT Cluster system is successful accessing the Pseudo code database table then it shall first send the return_status message containing a zero in its status field and then generate and send the DD_Pseudo_Code_Return message to the MPT Interface system.

```
DD_Document_Return { char message = 96,
    char mac_address [12],
    char organization_name[32],
```

-continued
```
    char user_name[32],
    char password[20],
    char document_name [32],
    char document_write_privilege [32],
    int number_pseudo_code_bytes,
    char pseudo_code[number_pseudo_code_bytes],
}
```

If the MPT Cluster system is unsuccessful accessing the Pseudo code database table then it shall send the return_status message containing a non-zero in its status field to the MPT Interface system.

Figure 19:
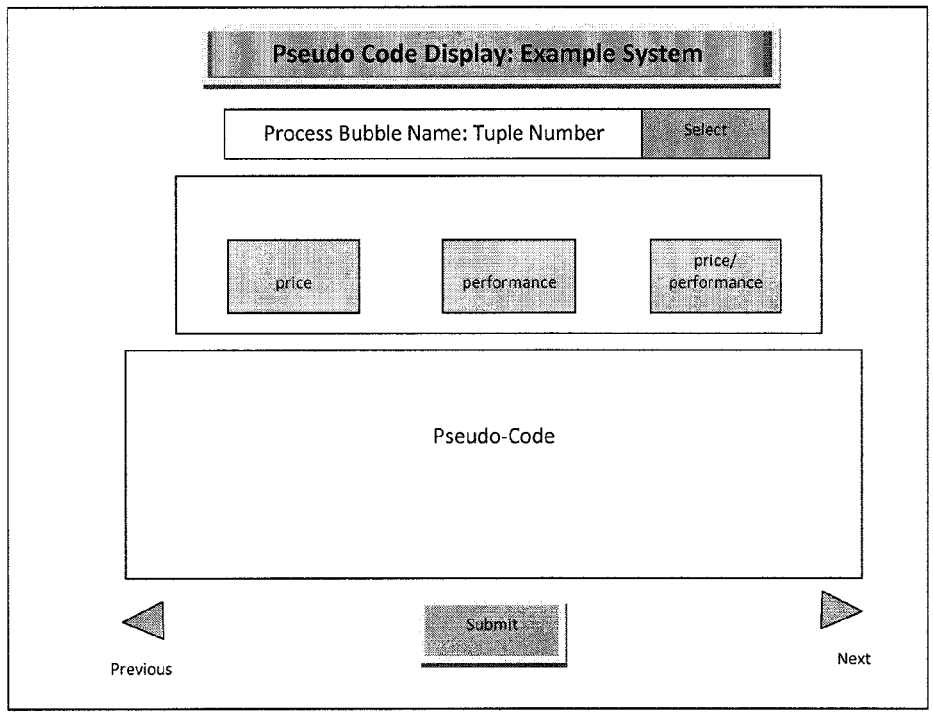
FIG. 19 is an illustration of a pseudocode popup window.

Upon receipt of the DD_Pseudo_Code message the MPT Interface system shall display the Pseudo Code Display Pop-up screen, as illustrated in FIG. 19.

Single left-clicking the Select button makes all bubble names and tuples available to the member in a pull-down selection box. Once a bubble name has been selected (single left-clicking the desired item), the pseudo-code for that selection is displayed. An authorized member can change the value of the pseudo-code directly from the pop-up screen. If the pseudo-code for the selected bubble does not exist, then a blank area is displayed. Placing the curser at any of the display area boundaries causes the display to show more in that direction. The boundaries are the up, down, left, or right edges of the screen. Selecting the Next button displays the next bubble's pseudo-code whereas selecting the Previous button displays the previous bubble's pseudo-code. Selecting the Submit button removes the Pseudo Code Display pop-up screen and returns control to the Detailed Design screen.

Once an authorized member has selected the Display Pseudo Code button followed by the Write Design button then the MPT Interface system shall generate and send the DD_Pseudo_Code_Request message to the MPT Cluster system.

```
DD_Pseudo_Code_Request {    char message = 95,
                            char mac_address [12],
                            char organization_name[32],
                            char user_name[32],
                            char password[20],
                            char document_name [32],
}
```

Upon receive of the DD_Pseudo_Code_Request message the MPT Cluster system shall attempt to extract the Pseudo code database table data for the current document name. If the MPT Cluster system is successful accessing the Pseudo code database table then it shall first send the return_status message containing a zero in its status field and then generate and send the DD_Pseudo_Code_Return message to the MPT Interface system.

```
DD_Pseudo_Code_Return {    char message = 96,
                           char mac_address [12],
                           char organization_name[32],
                           char user_name[32],
                           char password[20],
                           char document_name [32],
                           int number_pseudo_code_bytes,
                           char pseudo_code[number_pseudo_code_bytes],
}
```

If the MPT Cluster system is unsuccessful accessing the Pseudo code database table then it shall send the return_status message containing a non-zero in its status field to the MPT Interface system.

Upon receipt of the DD_Pseudo_Code message the MPT Interface system shall display the Pseudo Code Display Pop-up screen, resembling that of FIG. 19, and similar to that seen when viewing pseudocode.

Single left-clicking the Select button makes all bubble names and tuples available to the authorized member in a pull-down selection box. Once a bubble name has been selected (single left-clicking the desired item), the pseudo-code for that selection is displayed. An authorized member can change the value of the pseudo-code directly from the pop-up screen. If the pseudo-code for the selected bubble does not exist, then a blank area is displayed. The price and performance goals selection buttons allow the authorized member to note whether or not price, performance or price/performance is the goal of the current pseudo-code. Placing the curser at any of the display area boundaries causes the display to show more in that direction. The boundaries are the up, down, left, or right edges of the screen. Selecting the Next button displays the next bubble's pseudo-code whereas selecting the Previous button displays the previous bubble's pseudo-code. Selecting the Submit button shall cause the MPT Interface system to generate and send the DD_Pseudo_Code_Change_Request message to the MPT Cluster system.

```
DD_Pseudo_Code_Change_Request {   char message = 97,
                                  char mac_address [12],
                                  char organization_name[32],
                                  char user_name[32],
                                  char password[20],
                                  char document_name [32],
                                  int performance_selection,
                                  int number_pseudo_code_bytes,
                                  char pseudo_code[number_pseudo_code_bytes],
}
```

Upon receipt of the DD_Pseudo_Code_Change_Request message, the MPT Cluster system shall attempt to modify the pseudo code database table. If the MPT Cluster system is successful in modifying the pseudo code database table then it shall send the return_status message containing a zero in its status field to the MPT Interface system. If the MPT Cluster system un-successful in modifying the pseudo code database table then it shall send the return_status message containing a non-zero in its status field to the MPT Interface system. Selection of the Submit button on the Pseudo Code Display screen shall cause the Pseudo Code Write pop-up screen to be removed and returns control to the Detailed Design screen.

State Machine Display

Figure 20:
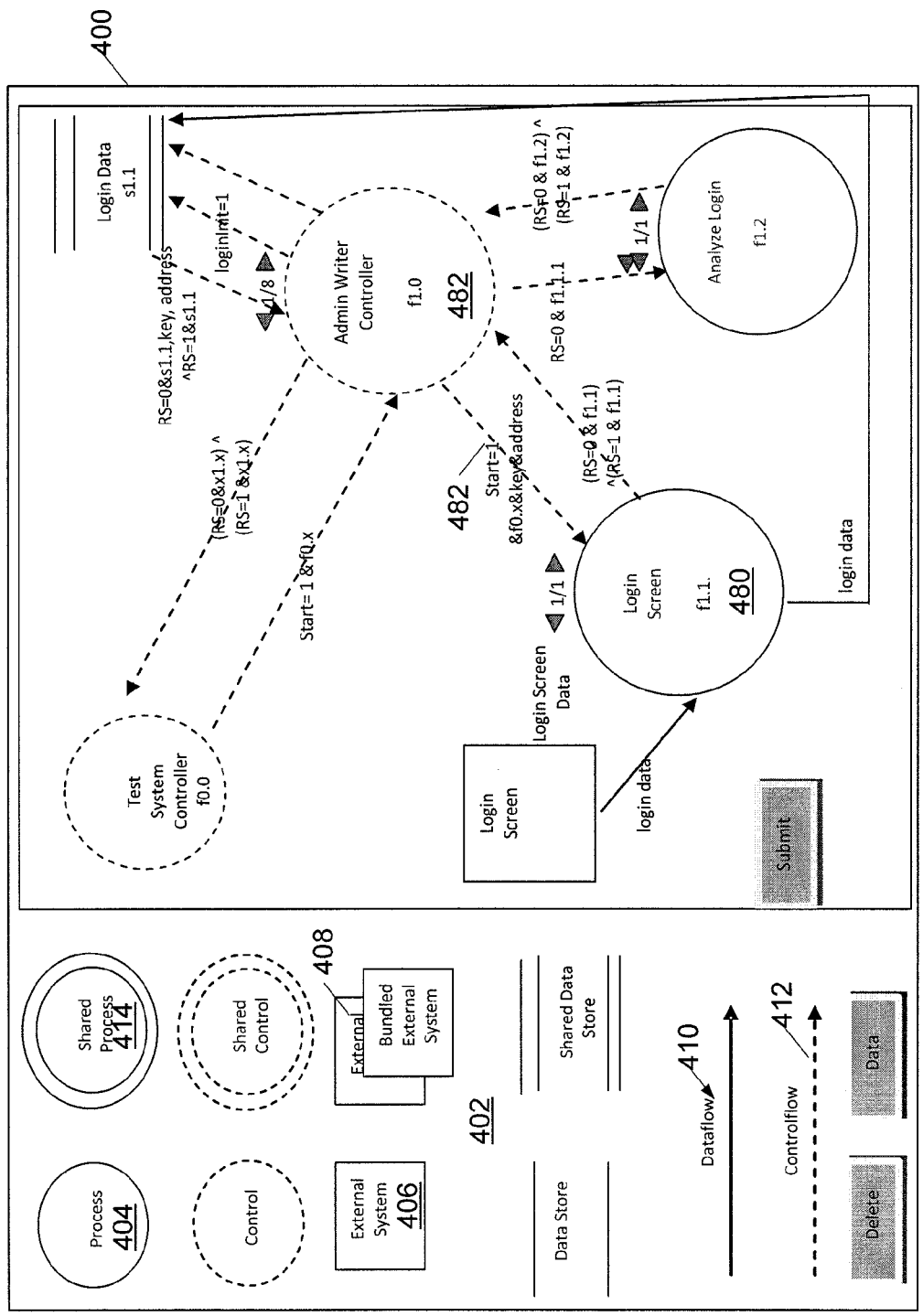
FIG. 20 is an illustration of a state machine popup window.

A state machine display is illustrated in FIG. 20. Since MPT state machines are hierarchical, they are similar to the Harel state machines from which Universal Modeling Language (UML) state machines are derived. In the MPT state machine model, all super- and sub-states are derived from the natural function decomposition of a problem. The sub-most states corresponding to the lowest level control decomposition found in the high-level design. Since a state machine can only communicate from one state, such as state 480, to another, such as state 482, and that only through state transitions, such as transition 484. State: a state is any action taken by the system. An action in this case can be a transformation, display, movement or storage of data, making the definition of a state equivalent to the definition of a process. A state can also be an entire state machine. State transition: a state transition is any condition that forces a new state. Since a state is equivalent to a process, this definition becomes equivalent to the definition of control. With these two definitions along with the observation that a data store represents some either latent or actual transformation, movement or storage of data and, thus, can be considered a state, while the invocation or destruction of that store can be considered a transition, a decomposition drawing is now transformed into a state machine.

Figure 21:
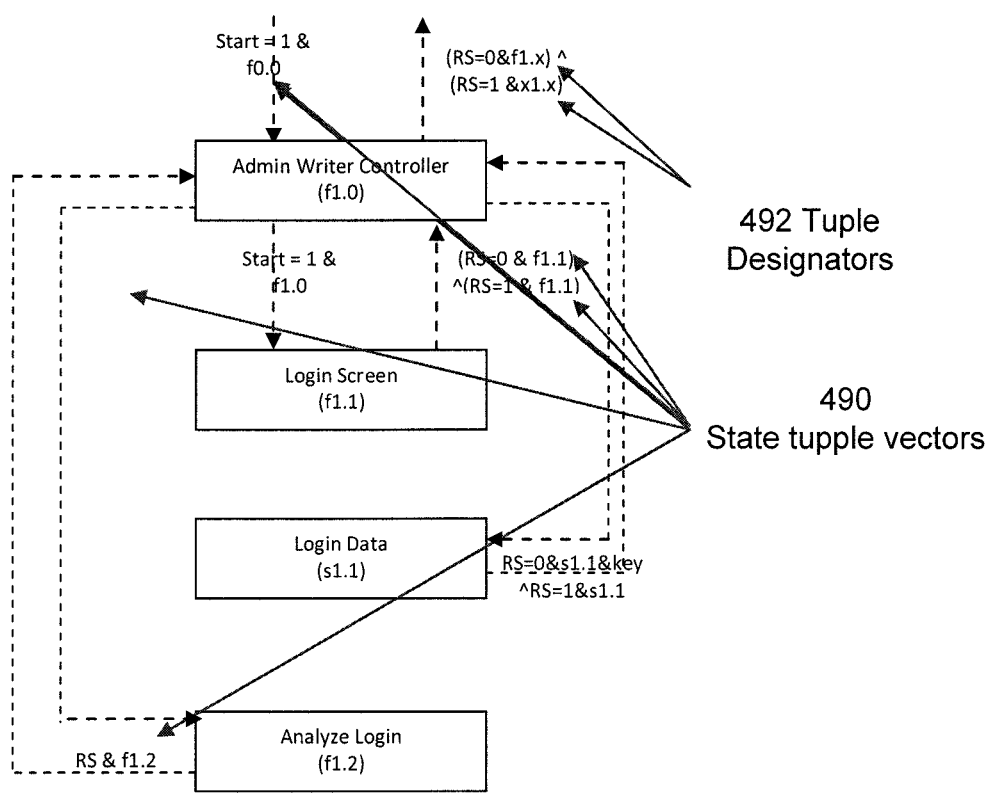
FIG. 21 is an illustration of a state machine as entered in a popup window.

The lower-level controller shown above generates the state machine of FIG. 21.

Although a data store acts like a state in the state diagram, its tuple designation begins with an "S" for store, rather than with an "F" for function. If the store is a shared store (occurs between processes) then a Posix shared-memory key is returned as part of the state transition. Whether or not the store is shared, the address to the stored variables is returned as part of the state transition. The address values along with any optional shared key values form part of the state transition vector to various other states. Translating between control bubbles/data-stores and a state machine is now straight-forward:

1) The central control bubble is always the initial state.
2) The invocation of a data store is a state transition.
3) A data store is a state for allocations and de-allocations.
4) All controlflows connecting to the central control bubble are accepted as state transition vectors.
5) There is a special state vector called the tuple vector that always identifies the originating state of the state-transition vector. The tuple vector can have a place holder allowing the system to ignore lower-order tuple values.
6) All process bubbles are considered states.
7) External systems are not shown on the state machine, but any state transition (control) from an external system is displayed.
8) Higher-level control bubbles are not shown on the state machine; only the transition vectors from and to the higher-level control bubbles are shown.
9) State transition vector conditions can be grouped using parenthesis along with "and" symbols (&) and "or" symbols (^). The unary operator not (~) in front of a state transition vector reverses the condition.

Multiple Connected State Machines

A process bubble can either decompose into a lower level decomposition diagram (containing both process and control bubbles) or pseudo-code. If the process bubble decomposes into a lower level decomposition diagram then the central control bubble is connected to the higher level decomposition diagram via the invocation signal that the higher level central bubble used to invoke its same level process bubble. This means that an application is comprised of multiple, connected state machines. Within this model multiple connect state machines are depicted as a state machine with some states high-lighted. The high-lighted states can be decomposed into an entire state machine.

State Machine View

Selecting the Display State Machines button followed by the View Design button causes the MPT Interface system to generate and send the DD_State_Request message to the MPT Cluster system.

```
DD_State_Request {    char message = 98,
                      char mac_address [12],
                      char organization_name[32],
                      char user_name[32],
                      char password[20],
                      char document_name [32],
}
```

Upon receipt of the DD_State_Request message the MPT Cluster system shall attempt to access the State database table for the data of the selected document name. If the MPT Cluster system is successful in obtaining the State data then it shall first send the return_status message containing a zero in its status field, followed by the DD_State_Return message to the MPT Interface system.

```
DD_State_Return {     char message = 99,
                      char mac_address [12],
                      char organization_name[32],
                      char user_name[32],
                      char password[20],
                      char document_name [32],
                      int number_state_bytes,
                      char state[number_state_bytes],
}
```

If the MPT Cluster system is un-successful in obtaining the State data then it shall send the return_status message containing a non-zero value in its status field to the MPT Interface system.

Upon receipt of the DD_State_Return message the MPT Interface system shall display the State Machine Display pop-up screen, which is essentially the same as the state machine write-enabled pop-up screen.

Placing the curser at any of the display area boundaries causes the display to show more in that direction. The boundaries are the up, down, left, or right edges of the screen. Selecting the Next button causes the next state machine to be displayed. Selecting the Previous button causes the prior state machine to be displayed. A state that is high-lighted (a different color) can be selected by double left clicking that state. Selecting a high-lighted state shall cause another Write State Machine pop-up (containing the selected state machine) to appear. Selecting the return button on the State Machine pop-up shall cause control to be returned to the calling screen.

State Machine Write

Selecting the Display State Machines button followed by the Write Design button causes the MPT Interface system to generate and send the DD_State_Request message to the MPT Cluster system.

Upon receipt of the DD_State_Request message the MPT Cluster system shall attempt to access the State database table for the data of the selected document name. If the MPT Cluster system is successful in obtaining the State data then it shall first send the return_status message containing a zero in its status field, followed by the DD_State_Return message to the MPT Interface system.

If the MPT Cluster system is un-successful in obtaining the State data then it shall send the return_status message containing a non-zero value in its status field to the MPT Interface system.

Upon receipt of the DD_State_Return message the MPT Interface system shall display the State Machine Write pop-up screen. An authorized member selecting a state with a single left-click can change the name or tuple number of the state. Changing the name or tuple number of a state changes the name and tuple value of the associated bubbles. Selection of the Submit button on the State Machine Write pop-up screen shall cause the MPT Interface system to generate and send the DD_State_Change_Request message to the MPT Cluster system.

```
DD_State_Change_Request {  char message = 100,
                           char mac_address [12],
                           char organization_name[32],
                           char user_name[32],
                           char password[20],
                           char document_name [32],
                           int number_state_bytes,
                           char state[number_state_bytes],
}
```

Upon receipt of the DD_State_Change_Request message the MPT Cluster system shall attempt to access and modify the state database table. If the MPT Cluster system is successful modifying the state database table it shall send the return_status massage containing a zero in its status field to the MPT Interface system. If the MPT Cluster system is un-successful modifying the state database table it shall send the return_status message containing a non-zero to the MPT Interface system.

Below are the messages displayed on the Detail Design Screen,

Privileges Successfully Submitted
 Privilege Submission Unsuccessful
 Pseudo Code Successfully Changed
 Pseudo Code Not Changed Error
 State Machine Successfully Changed
 State Machine Not Changed Error
 Different Machine Used Test Plans and Procedures The originating data for any system comes from external systems. Allowing an authorized member to enter some set of originating data while also insuring that the expected output at each portion of the system is correctly produced allows the system to generate a full-system test procedure. In addition, using the purpose from the bubble charts and the connection of those bubbles to requirements allows the system to create a test plan. To access the test plans and procedures, the member selects the Software Design button 202 followed by the Test Plans button 210 as shown on FIG. 2. The Project Title field is then selected, giving access to either the test plans or the test procedures of the project.

Enabling Access

In order to allow write privileges for test plans and procedures, an administrator-level member selects the Software Design button, the Test Plans button followed by the selection of the Project title, the selection of the member name, and finally, the Privileges button. The selection of the privileges button shall cause the MPT Interface system to generate and send the Test_Write_Privilege_Request message to the MPT Cluster system. If the member has already been selected then that member shall be deselected.

```
Test_Write_Privilege_Request {  char message = 101,
                                char mac_address [12],
                                char organization_name[32],
```

```
                    char user_name[32],
                    char password[20],
                    bool test_write_privileges,
                    char document_name [32],
                    char member_name[32]
}
```

Upon receipt of the Test_Write_Privilege_Request message the MPT Cluster system shall attempt to modify the test privilege database table. If the MPT Cluster system is able to modify the test privilege database table then it shall send the return_status message containing a zero in the status field to the MPT Interface system. If the MPT Cluster system is unable to modify the test privilege database table then it shall send the return_status message containing a non-zero in the status field to the MPT Interface system.

Test Plan Display

Selecting the Display Test Plans button shall cause the MPT Interface system to generate and send the Test_Data_Request message to the MPT Cluster system.

```
Test_Data_Request {   char message = 102,
                      char mac_address [12],
                      char organization_name[32],
                      char user_name[32],
                      char password[20],
                      char document_name [32]
}
```

Receipt of the Test_Data_Request message, the MPT Cluster system shall attempt to access the test data database table. If the MPT Cluster system is able to access the test data database table it shall first send the return_status message containing a zero in the status field followed by sending the Test_Data_Response data to the MPT Interface system.

```
Test_Data_Return {    char message = 103,
                      char mac_address [12],
                      char organization_name[32],
                      char user_name[32],
                      char password[20],
                      char document_name [32],
                      char document_write_privilege [32],
                      int number_test_data_bytes,
                      char test_data[number_test_data_bytes]
}
```

If the MPT Cluster system is unable to access the test data database table then it shall send the return_status message containing a non-zero in its status field to the MPT Interface system.

Figure 22:
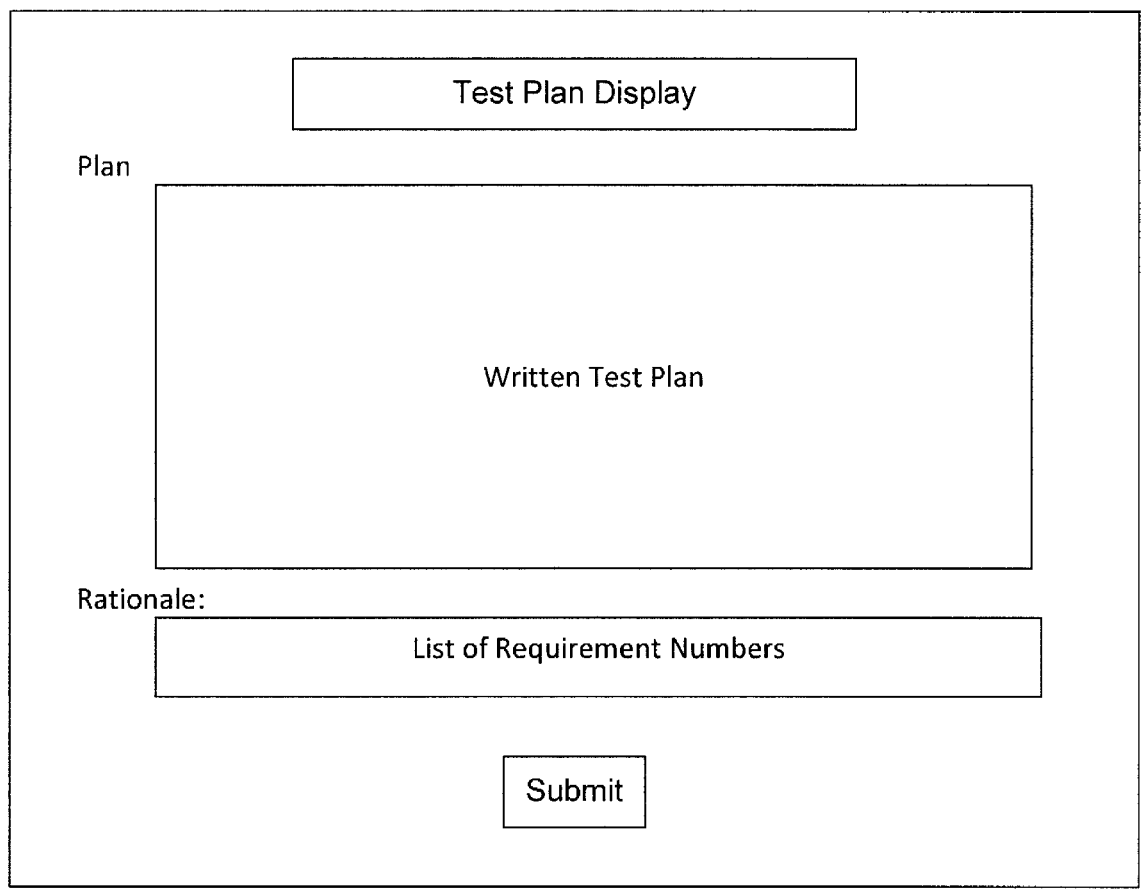
FIG. 22 is an illustration of a test plan popup.

Upon receipt of the Test_Data_Response message by the MPT Interface system, the MPT Interface system shall display the Test Plan pop-up screen FIG. 22.

When another page of the test plans is required, it can be displayed either by directly entering the test name and pressing the Previous or Next buttons, or by selecting a test name from the list of test names.

Selecting the Write Test Plans button shall cause the MPT Interface system to generate and send the Test_Data_Request message to the MPT Cluster system.

```
Test_Data_Request {   char message = 102,
                      char mac_address [12],
```
                    char organization_name[32],
                    char user_name[32],
                    char password[20],
                    char document_name [32]
}
```

Receipt of the Test_Data_Request message, the MPT Cluster system shall attempt to access the test data database table. If the MPT Cluster system is able to access the test data database table it shall first send the return_status message containing a zero in the status field followed by sending the Test_Data_Response data to the MPT Interface system.

```
Test_Data_Return {    char message = 103,
                      char mac_address [12],
                      char organization_name[32],
                      char user_name[32],
                      char password[20],
                      char document_name [32],
                      int number_test_data_bytes,
                      char test_data[number_test_data_bytes]
}
```

If the MPT Cluster system is unable to access the test data database table then it shall send the return_status message containing a non-zero in its status field to the MPT Interface system.

Upon receipt of the Test_Data_Response message by the MPT Interface system, the MPT Interface system shall display the Test Plan Write pop-up screen. The authorized member can change the written test plan and requirements fields. Selecting the Submit button on the Test Plan Write screen shall cause the MPT Interface screen to generate and send the Test_Change_Request message to the MPT Cluster system.

```
Test_Plan_Change_Request {    char message = 104,
                              char mac_address [12],
                              char organization_name[32],
                              char user_name[32],
                              char password[20],
                              char document_name [32],
                              int number_test_data_bytes,
                              char test_data[number_test_data_bytes]
}
```

Upon receipt of the Test_Change_Request message the MPT Cluster system shall attempt to modify the test data database table. If the MPT Cluster system is able to modify the test data database table then it shall send the return_status message containing a zero to the MPT Interface system. If the MPT Cluster system unable to modify the test data database table then it shall send the return_status message containing a non-zero to the MPT Interface system. The test plans write window is essentially the same as the test plans display window illustrated in FIG. 22.

When another page of the test plans is required, it can be displayed either by directly entering the test name and pressing the Previous or Next buttons, or by selecting a test name from the list of test names. An authorized member can change the value of the test plan or the list of requirements. The list of requirements associates the test plan with the requirement traceability matrix. Changing the list of requirements causes the requirement traceability association to change.

Test Procedures

As has been shown in the MPT Malicious Software Detector document, it is possible to test a kernel by inserting the proper input data and the expected output data at the appropriate locations. This can be accomplished by the authorized member selecting the appropriate input dataflow for a kernel and filling in the data that is associated with the input-data item of that flow. This requires the data dictionary to be modified by adding the unit value column into the following:

| Flow Type (Data/Control) | Flow Name | Unit Name | Unit Type | Unit Value |
|---|---|---|---|---|

Table 6 Unit Value Column Added to Data Dictionary

Adding the Unit Value column allows the authorized member to add both the appropriate input data values and the appropriate expected output values. When the state machine is accessed, the input value is automatically placed in the appropriate field, and at state transition, the appropriate output values are checked. This is performed in the Collaborative Kernel level debugging section of the MPT Malicious Software Detector. The list of inputs and expected outputs per kernel can be displayed as a test procedure by selecting the Display Test Procedures Button, causing the Test Procedure Display pop-up screen to be displayed, FIG. 23.

Selecting the correct procedure is accomplished by either entering the test name or selecting the test name from the pull-down list and selecting the Previous or Next buttons. Selecting the Submit button causes the Test Procedure pop-up screen to be removed. Both the Test Plan and the Test Procedure pop-up screens can be simultaneously displayed. The test name associates the test procedure with the test plan which is associated with in the requirements traceability matrix.

```
Test_Procedure_Change_Request {          char message = 107,
    char mac_address [12],
    char organization_name[32],
    char user_name[32],
    char password[20],
    char document_name [32],
    int number_test_data_bytes,
    char test_data[number_test_data_bytes]
}
```

Below are the messages displayed on the Test Plan/Procedure Screen,
1. Privileges Successfully Submitted
2. Privilege Submission Unsuccessful
3. Test Plan Successfully Changed
4. Test Plan Not Changed Error
5. Test Procedure Successfully Changed
6. Test Procedure Not Changed Error
7. Different Machine Used Requirements Traceability Matrix When all columns for all requirements are in filled and no further requirements are added, the application is complete.

MPT Algorithm as an Interpreted State Machine

The MPT Interface document presents the idea of graphically linking together multiple MPT kernels to form an MPT algorithm. Prewritten MPT kernels may be provided for many common functions, particularly including common functions relating to matrix operations and transforms such as the Fourier transform.

Figure 24:
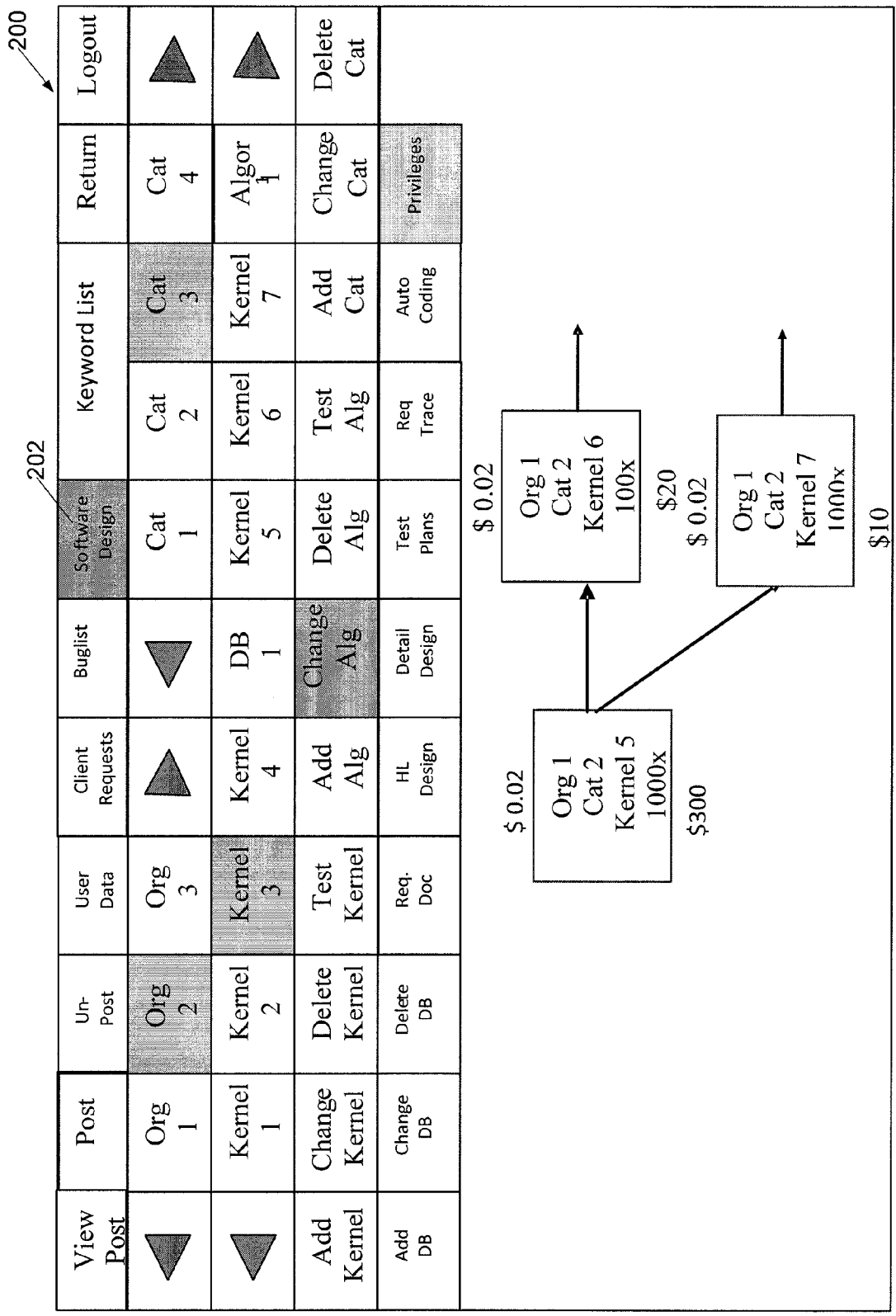
FIG. 24 is an illustration of invoking prepackaged kernels for autocoding.
Figure 25:
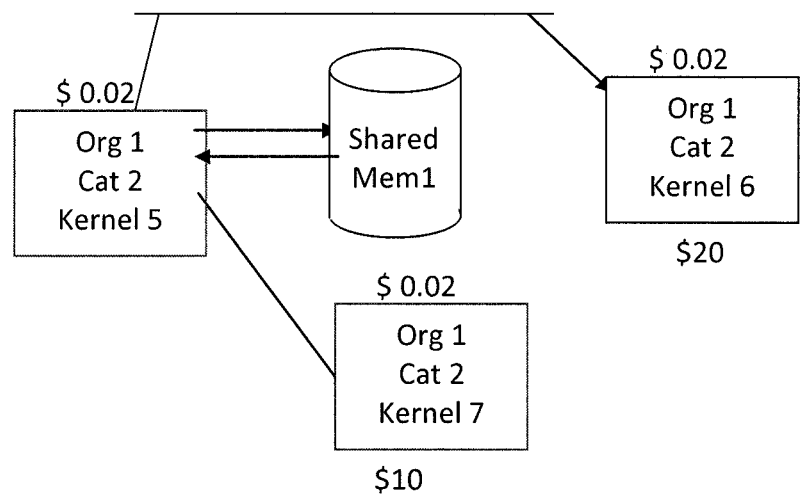
FIG. 25 is an illustration showing kernels communicating through shared memory and with each other.

It should be noted that there can be three types of MPT Kernels, as shown on FIG. 24

Control, Process, and Mixed. Pure Control Kernels contain the following statement types: branching, looping, and subroutine calls. Pure Process Kernels contain perform the following duties without branches, loops, or subroutine calls: display data, move data, store data, and transform data. Mixed Kernels may perform the duties of a Process Kernel but also have control statements. Code that has not been designed is typically made up of primarily Mixed Kernels. Code that has been completely designed contains only pure control and pure process kernels. Therefore, a metric which defines the percent of the code completed can now be defined.

MPT Design Metric (MDM): $D=100*((P+C)/(P+C+M))$ where: D=Design percentage
P=# of pure process kernels
C=# of pure control kernels
M=# of mixed kernels The range of the MDM is 0 to 100 with 100 being completely designed code and 0 being completely ad-hoc code. If code has been designed using the MPT Software Design tool then MDM from this code will be at 100. There are two ways to pass information to a kernel, by reference or by value. If the value of the information is sent directly to the kernel then the standard kernel-to-kernel model is appropriate. If a pointer to some shared-memory location is sent to the kernel then the standard model is changed to reflect that difference.

The top line directly connecting Kernel-5 to Kernel-6 contains an address reference to Shared Mem1. The value of some variable in Shared Mem1 plus the Posix shared-memory key (as a variable) is now shared between Kernel-5 and Kernel-6.

Automatic Control Code Generation

It is now possible to construct a state transition table from the MPT Design model. The state-transition table is a form of interpreted code in which all control is accomplished. This table contains only five columns: state index, call state process/NOP, condition, next state index condition true, and next state index condition false. Below shows the format of the table:

TABLE 7

STATE TRANSITION TABLE

| State Index | Call Process or NOP | Condition | Next State Index (Condition True) | Next State Index (Condition False) |
|---|---|---|---|---|

The State Index field is the row index value for the state transition table and starts with zero. This index allows a state to be accessed. The Call Process or NOP field contains the name and parameters of a .DLL or .SO code (function calls) that is to be run or the symbol "NOP". NOP means that no function is called, instead the condition is evaluated and the next state indexes accessed. All .DLL/.SO function calls contain the same list of parameters: key, starting address, size, and structure-type. The key is the POSIX key value that allows virtual shared memory to be differentiated. The starting address is the first location of virtual shared memory address, allowing input and output variables to be passed between .DLL/.SOs without passing information by value (eliminating memory-to-memory copies). The size field contains the number of bytes of shared memory accessible by the .DLL/.SO. Finally, the Struct Type field is the name of the structure used to interpret the shared memory.

When the condition of the current row is met, the state index designated by the next state index (Condition True) is used to access the next state (state transition table row). If the condition of the current row is not met then the state index designed by the next state index (Condition False) is used to access the next state. If the next state is represented by the end-of-application symbol (–) then the application is considered complete and the job is complete.

The Condition field uses the following symbols to create a condition: equal "=", not equal "~=", greater than ">", less than "<", less than or equal to "<=" or greater than or equal to ">=" symbols plus the group start "("and group end")" symbols. Groups can be linked with the AND (&) or OR (^) symbols. Below are some condition examples:

| Example Type | Condition Example |
|---|---|
| = | A = 0, A = B |
| ~= | A ~= 0, A ~= B, B ~= A |
| > | A > 0, A > B |
| < | A < 0, A < B |
| <= | A <= 0, A <= B |
| >= | A >= 0, A >= B |
| ( ) | (A = 0), (A = B), (A ~= 0), (A ~= B), (B ~= A), (A > 0), (A > B), (A < 0), (A < B), (A <= 0), (A <= B), (A >= 0), (A >= B) |

Below shows an example of a state transition table

TABLE 9

EXAMPLE STATE TRANSITION TABLE

| State Index | Call Process or NOP | Condition | Next State Index (Condition True) | Next State Index (Condition False) |
|---|---|---|---|---|
| 0 | Kernel_5(key, start_address, size, structure_type) | Structure_type.flag = 0 | 2 | 1 |
| 1 | NOP | Structure_type.flag > 0 | 3 | 2 |
| 2 | Kernel_6(key, start_address, size, structure_type) | (Structure_type.message = 93) & (Structure_type.flag = 0) | 285 | 285 |
| 3 | Kernel_7 key, start_address, size, structure_type) | Structure_type.message > 40 | 2 | — |

Since the State Transition Table represents all possible states and the conditions under which those states are accessed, this table can be thought of as the code that calls all of the functions used by an algorithm, and thus, represents unique form of automatic programming. The two next state indexes.

Generation of Data Stores

While creating the function decomposition of an application, the various data storage areas are also defined. By taking all of the input and output data definitions for all dataflows to every data storage location, combined with the data store name to automatically define all data stores.

Automatic Functionality Selection

The definition of each of the process bubbles from the design includes: Object price and performance goals (created in pseudo-code write screen), Input/output dataflow definition (process bubble functional design), keyword list (from process bubble description), test input dataset definition (from test procedures), and expected output dataset definition (from procedures). This provides the information required to select functional components from the current or other organizations. The following steps are needed to automatically select the required functionality.
1) Using the keyword list, the MPT Cluster system shall search for kernels and algorithms that match the list at the lowest level of functional decomposition.
2) The input and output dataflow definitions shall be used by the MPT Cluster system to eliminate potential functional elements. Functional elements shall be culled by matching the input and output values of the found functional elements to the equivalent design process elements, creating the culled list.
3) The culled list shall be refined by executing the kernels/algorithms in the culled list using the test input datasets and comparing the results to expected output datasets.
4) The MPT Cluster system shall perform the final functional element selection based upon the selected price performance goal (price, performance, and price/performance).

The selected kernel or algorithm shall be inserted as the "state" in the low-level state-machine and as the kernel or algorithm on the Interface Main screen.

Lego-Block Process Code Selection

Since each state represents both an MPT Control Kernel plus one or more MPT Process Kernels, and since the Control Kernels are not written but the Process Kernels must be written, a way to differentiate completed kernels, auto-generated kernels, and incomplete kernels (stubs) is required. As has been discussed in the MPT Interface document, kernels can be dragged and dropped onto the Interface Main screen. Further, it has been shown in this document that a description of an MPT kernel can originate during a design session. Finally, this document has also shown that control kernels are automatically generated. It now becomes possible to have a placeholder kernel automatically inserted into the MPT Interface Main screen where either an already existing kernel can replace it or the code for that kernel can be written. The system-generated kernels and data stores (from the MPT Design Tools) are shown in purple, any completed process kernel is shown in green (from automatic functionality selection or previously drag and dropped functionality), and incomplete kernels are shown in gray. This is shown below:

Selecting the placeholder kernel then the appropriate organization, category, kernel, and the Add Kernel button causes the placeholder kernel to be replaced with the selected kernel as shown below:

Although this is not formally an instance of automatic coding, the effect of automatic state machine generation, automatic shared memory generation, and drag and drop selection of already constructed code and having that code correctly placed in the structure of the application is analogous in that code does not need to be written by the developer. In the above example, approximately three of four of the normally coded objects were automatically generated and not written by the developer.

Once code for the massively parallel computer system is generated, the development system may, under direction of a developer, submit all, or portions with appropriate test shells and test kernels, of the developed code, along with appropriate test data, through an access node 162 to a massively parallel computer system 164 for testing, or may submit the code for execution on real problems. The development system may also receive results of such execution from the access node to permit developers to determine if the code executed as intended.

The development system herein described has many features that can be combined in various combinations, as described below.

In a system designated A for development of software for a targeted parallel computing system, the system has at least one workstation, and at least one development machine, the development machine maintaining a program development database in communication with the workstation and a memory containing code for developing software for the parallel computing system; wherein the database further has for at least one program for the parallel computing system: program requirements, program design, program detailed code, test definitions, a traceability matrix, and MPT kernels; wherein the database automatically links and coordinates the program requirements, program design, program detailed code, test definitions, a traceability matrix, and MPT kernels, and herein the detailed code and MPT kernels form portions of the software for the targeted parallel computing system.

In a system designated B including the system designated A also has a parallel computing system in communication with the development machine, the parallel computing system being capable of executing software developed by the system.

A system designated C, including the system designated B wherein the parallel computing system is a howard cascade.

A system designated D including the system designated A, B, or C wherein the code for developing software on the development machine comprises code for coordinating decomposition, state-machines, processing process-bubble keyword list, maintaining process-bubble descriptions, maintaining and revising MPT Kernels in the database, and for maintaining MPT Algorithms associated with the MPT kernels.

A system designated E including the system designated A, B, C, or D wherein the code for developing software compels decomposition of a software problem until there is complete separation between process and control.

A system designated F including the system designated E wherein the code for developing software automatically generates a state-machine from the decomposition, using process bubbles as states and control flows as state-transitions.

The system designated G including the system designated F or E, wherein the code for developing software automatically generates an MPT Algorithm directly from the decomposition whereby there is complete separation between process and control.

A system designated H including the system designated E, F, or G wherein the code for developing software includes code for automatically generates an MPT Algorithm directly from the decomposition whereby there is complete separation between process and control.

A system designated I including the system designated E, F, G or H wherein the code for developing software includes code for automatically creating MPT kernels from the lowest level decomposition process bubbles.

A system designated J including the system designated E, F, G, H, or I wherein the code for developing software includes code for automatically defining parameters from input and output dataflows of dataflows for MPT Algorithms.

A system designated K including the system designated E, F, G, H, I, or J wherein the code for developing software includes code for automatically defining parameters from input and output dataflows attached to process-bubbles for MPT Kernels.

A system designated L including the system designated E, F, G, H, I, J or K wherein the code for developing software includes code for using the process-bubble keyword list, parameters, test values and expected results to automatically locate already existing MPT Algorithms and MPT Kernels for use as the Algorithms and Kernels within at least one newly defined MPT Algorithm.

A system designated M including the system designated E, F, G, H, I, J or K wherein the code for developing software includes code for using the process-bubble description, generated parameters, and generated state transitions to create a stub of a program element selected from the group consisting of an MPT Algorithm and an MPT Kernel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for development of software for a targeted parallel computing system comprising:
at least one development machine maintaining a program development database and having a memory containing code for developing software for the parallel computing system;
wherein the database further comprises, for at least one program for the parallel computing system, a hierarchical cascade of: program requirements, program design, program detailed code, test definitions, a traceability matrix, and MPT kernels;
wherein the database automatically links and coordinates the program requirements, program design, program detailed code, test definitions, traceability matrix, and MPT kernels; and
wherein the program detailed code and MPT kernels form portions of the software for the targeted parallel computing system;
wherein the code for developing software on the development machine comprises code for coordinating decomposition, state-machines, processing a process-bubble keyword list, maintaining process-bubble descriptions, maintaining and revising MPT kernels in the database, and for maintaining MPT algorithms associated with the MPT kernels;

wherein the code for developing software includes code for automatically generating a state-machine from decomposition, using process bubbles as states and control flows as state-transitions;
and
wherein the code for developing software includes code for automatically creating MPT kernels from the lowest level decomposition process bubbles.

2. The system of claim 1 further comprising a parallel computing system in communication with the development machine, the parallel computing system being capable of executing software developed by the development system.

3. The system of claim 2 wherein the parallel computing system is a howard cascade.

4. The system of claim 1 wherein the code for developing software includes code for compelling decomposition of a software problem until there is complete separation between process and control.

5. The system of claim 4 wherein the code for developing software includes code for automatically generating an MPT Algorithm directly from the decomposition whereby there is complete separation between process and control.

6. The system of claim 5 wherein the code for developing software includes code for automatically defining parameters from input and output dataflows for the MPT algorithms.

7. The system of claim 5 wherein the code for developing software includes code for automatically defining parameters from input and output dataflows attached to process-bubbles for MPT kernels.

8. The system of claim 5 wherein the code for developing software includes code for using the process-bubble keyword list, parameters, test values and expected results to automatically locate already existing MPT algorithms and MPT kernels for use as the algorithms and kernels within at least one newly defined MPT algorithm.

9. The system of claim 5 wherein the code for developing software includes code for using the process-bubble description, generated parameters, and generated state transitions to create a stub of a program element selected from the group consisting of an MPT algorithm and an MPT kernel.

* * * * *